(12) United States Patent
Li et al.

(10) Patent No.: US 11,799,606 B2
(45) Date of Patent: Oct. 24, 2023

(54) MULTI-PORT-GROUP UPLINK CONTROL INFORMATION SIGNALING AND RELATED SYSTEMS AND METHODS

(71) Applicant: QUALCOMM Incorporated, San Diego, CA (US)

(72) Inventors: Qiaoyu Li, Beijing (CN); Yu Zhang, Beijing (CN); Yi Huang, San Diego, CA (US); Chenxi Hao, Beijing (CN); Liangming Wu, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 367 days.

(21) Appl. No.: 17/284,728

(22) PCT Filed: Nov. 1, 2018

(86) PCT No.: PCT/CN2018/113417
§ 371 (c)(1),
(2) Date: Apr. 12, 2021

(87) PCT Pub. No.: WO2020/087443
PCT Pub. Date: May 7, 2020

(65) Prior Publication Data
US 2021/0321419 A1    Oct. 14, 2021

(51) Int. Cl.
*H04L 5/00* (2006.01)
*H04W 76/11* (2018.01)
(Continued)

(52) U.S. Cl.
CPC .......... *H04L 5/0051* (2013.01); *H04L 1/1614* (2013.01); *H04L 1/1896* (2013.01);
(Continued)

(58) Field of Classification Search
CPC ... H04L 5/0051; H04L 1/1614; H04L 1/1896; H04L 27/2602; H04L 27/261; H04L 5/00;
(Continued)

(56) References Cited

U.S. PATENT DOCUMENTS

| 11,546,893 | B2 * | 1/2023 | Bala .................... H04L 5/001 |
| 2014/0112287 | A1 | 4/2014 | Chun et al. |

(Continued)

FOREIGN PATENT DOCUMENTS

| CN | 104704750 A | 6/2015 |
| CN | 105790814 A | 7/2016 |

(Continued)

OTHER PUBLICATIONS

International Search Report and Written Opinion—PCT/CN2018/113417—ISA/EPO—Jul. 30, 2019.

(Continued)

*Primary Examiner* — Rownak Islam
(74) *Attorney, Agent, or Firm* — Muncy, Geissler, Olds & Lowe, P C./Qualcomm Incorporated

(57) ABSTRACT

A method in accordance with aspects of the disclosure comprises receiving a plurality of downlink control information (DCI) signals, wherein each DCI signal is associated with a Demodulation Reference Signal (DMRS) Port Group (DMRS-PG) of a plurality of DMRS-PGs, and each DCI signal within the plurality of DCI signals contains a DMRS-PG Identifier (DMRS-PGID) identifying the associated DMRS-PG, performing one or more measurements associated with the each DCI signal, and generating a multi-port-group uplink control information (UCI) signal based on the one or more measurements associated with the each DCI, wherein the multi-port-group UCI signal contains an indication of whether the each DCI is successfully received. The indication can be explicitly contained in the UCI, or implic- (Continued)

itly realized using scrambling sequences associated with DMRS-PGs to scramble the UCI.

60 Claims, 12 Drawing Sheets

(51) Int. Cl.
*H04L 1/1607* (2023.01)
*H04L 1/1867* (2023.01)
*H04W 72/1263* (2023.01)
*H04L 27/26* (2006.01)
*H04W 72/21* (2023.01)
*H04W 72/23* (2023.01)
*H04W 72/542* (2023.01)

(52) U.S. Cl.
CPC ..... *H04L 27/2602* (2013.01); *H04W 72/1263* (2013.01); *H04W 72/21* (2023.01); *H04W 72/23* (2023.01); *H04W 72/542* (2023.01); *H04W 76/11* (2018.02); *H04L 27/261* (2013.01)

(58) Field of Classification Search
CPC . H04W 72/1263; H04W 72/21; H04W 72/23; H04W 72/542; H04W 76/11

USPC ......................................................... 370/329
See application file for complete search history.

(56) References Cited

U.S. PATENT DOCUMENTS

| 2015/0215905 | A1 | 7/2015 | Park et al. | |
| 2019/0115996 | A1* | 4/2019 | Wu | H04L 1/0003 |
| 2019/0296876 | A1* | 9/2019 | Zhang | H04L 5/0048 |
| 2022/0060293 | A1* | 2/2022 | Matsumura | H04L 1/1896 |

FOREIGN PATENT DOCUMENTS

| CN | 108702753 A | 10/2018 |
| WO | 2011011566 A2 | 1/2011 |

OTHER PUBLICATIONS

Supplementary European Search Report—EP18938462—Search Authority—The Hague—May 27, 2022.

* cited by examiner

MULTI-PORT-GROUP UPLINK CONTROL INFORMATION SIGNALING AND RELATED SYSTEMS AND METHODS

CROSS-REFERENCE TO RELATED APPLICATIONS

The present application claims priority to International Application No. PCT/CN2018/113417, filed Nov. 1, 2018, which is herein incorporated by reference in its entirety.

TECHNICAL FIELD

Aspects of this disclosure relate generally to multi-port-group uplink control information (UCI) signals, and more particularly to generation and processing thereof.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

In prior wireless communications systems, a network or element thereof will transmit downlink control information (DCI) to a user equipment (UE) equipped to communicate with the network. The DCI may include, for example, scheduling data relating to uplink transmissions from the UE to the network and/or downlink transmissions from the network to the UE. Moreover, the DCI may prompt the UE to generate and transmit uplink control information (UCI). The UCI may include the results of measurements or other information that enables the DCI to modify, if necessary, transmission parameters within the wireless communications system. For example, UCI may include Channel Status Information (CSI) that indicates various characteristics of the link quality between the network and the UE, ACK and NACK relating to a Hybrid Automatic Repeat Request (HARQ) scheme, and/or scheduling requests. Prior UEs may receive DCI from one or more network elements, and may respond by transmitting to the network element from which the DCI was received UCI relating to the network element from which the DCI was received.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

As noted above, prior UEs may receive DCI from a particular network element and may respond to the particular network element by transmitting feedback information relating to the network element from which the DCI was received. As the number of network elements increases, a corresponding increase in UCI transmissions may result in increased overhead within the wireless communication system and/or increased power consumption at the UE, thereby reducing signaling efficiencies. Accordingly, the advancement of the goals associated with the 5G mobile standard requires new techniques.

SUMMARY

The following summary is an overview provided solely to aid in the description of various aspects of the disclosure and is provided solely for illustration of the aspects and not limitation thereof.

In accordance with aspects of the disclosure, a method for wireless communication by a user equipment (UE) is provided. The method comprises receiving a plurality of downlink control information (DCI) signals, wherein each DCI is associated with a Demodulation Reference Signal (DMRS) Port Group (DMRS-PG) of a plurality of DMRS-PGs, and each DCI signal within the plurality of DCI signals contains a DMRS-PG Identifier (DMRS-PGID) identifying the associated DMRS-PG, performing one or more measurements associated with the each DCI, generating a multi-port-group uplink control information (UCI) signal based on the one or more measurements associated with each DCI, wherein the multi-port-group UCI signal contains an indication of whether the each DCI is successfully received.

In accordance with aspects of the disclosure, a method for wireless communication by a network entity is provided. The method comprises generating a plurality of downlink control information (DCI) signals that schedule a user equipment (UE) for uplink transmission of uplink control information (UCI), wherein each DCI signal contains a Demodulation Reference Signal Port Group Identifier (DMRS-PGID) associated with a unique Demodulation Reference Signal Port Group (DMRS-PG) of a plurality of DMRS-PGs, transmitting the DCI signals to the UE, receiving a multi-port-group UCI signal from the UE, wherein the multi-port-group UCI signal includes feedback information scheduled by the successfully received DCIs of the transmitted plurality of DCI signals, as well as indications on whether the transmitted DCI signals are successfully received by the UE, and processing the multi-port-group UCI signal to determine association between the feedback information and the successful reception of each transmitted DCI signal.

In accordance with aspects of the disclosure, an apparatus is provided. The apparatus comprises a memory system configured to store data, instructions, or a combination thereof, a processing system coupled to the memory system, and at least one transceiver. The at least one transceiver is configured to receive a plurality of downlink control information (DCI) signals, wherein each DCI is associated with a Demodulation Reference Signal (DMRS) Port Group (DMRS-PG) of a plurality of DMRS-PGs, and each DCI signal within the plurality of DCI signals contains a DMRS-PG Identifier (DMRS-PGID) identifying the associated DMRS-PG. The processing system and the memory system are configured to perform one or more measurements associated with each DCI, and generate a multi-port-group uplink control information (UCI) signal based on the one or more measurements associated with each DCI, wherein the multi-port-group UCI signal contains an indication of whether each DCI is successfully received.

In accordance with aspects of the disclosure, another apparatus is provided. The apparatus comprises a memory system configured to store data, instructions, or a combination thereof, a processing system coupled to the memory system, and at least one transceiver. The processing system and the memory system are configured to generate a plurality of downlink control information (DCI) signals that schedule a user equipment (UE) for uplink transmission of uplink control information (UCI), wherein each DCI signal contains a Demodulation Reference Signal Port Group Identifier (DMRS-PGID) associated with a unique Demodulation Reference Signal Port Group (DMRS-PG) of a plurality of DMRS-PGs. The at least one transceiver is configured to transmit the DCI signals to the UE, and receive a multi-port-group UCI signal from the UE, wherein the multi-port-group UCI signal includes feedback information scheduled by the successfully received DCIs of the transmitted plurality of DCI signals, as well as indications on whether the transmitted DCI signals are successfully received by the UE. The processing system and the memory system are further configured to process the multi-port-group UCI signal to determine association between the feedback information and the successful reception of each transmitted DCI signal.

In accordance with aspects of the disclosure, yet another apparatus is provided. The apparatus comprises means for receiving a plurality of downlink control information (DCI) signals, wherein each DCI is associated with a Demodulation Reference Signal (DMRS) Port Group (DMRS-PG) of a plurality of DMRS-PGs, and each DCI signal within the plurality of DCI signals contains a DMRS-PG Identifier (DMRS-PGID) identifying the associated DMRS-PG, means for performing one or more measurements associated with the each DCI, and means for generating a multi-port-group uplink control information (UCI) signal based on the one or more measurements associated with the each DCI, wherein the multi-port-group UCI signal contains an indication of whether the each DCI is successfully received.

In accordance with aspects of the disclosure, yet another apparatus is provided. The apparatus comprises means for generating a plurality of downlink control information (DCI) signals that schedule a user equipment (UE) for uplink transmission of uplink control information (UCI), wherein each DCI signal contains a Demodulation Reference Signal Port Group Identifier (DMRS-PGID) associated with a unique Demodulation Reference Signal Port Group (DMRS-PG) of a plurality of DMRS-PGs, means for transmitting the DCI signals to the UE, means for receiving a multi-port-group UCI signal from the UE, wherein the multi-port-group UCI signal includes feedback information scheduled by the successfully received DCIs of the transmitted plurality of DCI signals, as well as indications on whether the transmitted DCI signals are successfully received by the UE, means for processing the multi-port-group UCI signal to determine association between the feedback information and the successful reception of each transmitted DCI signal.

In accordance with aspects of the disclosure, a non-transitory computer-readable medium comprising at least one instruction for causing a processor to perform operations is provided. The non-transitory computer-readable medium comprises code for receiving a plurality of downlink control information (DCI) signals, wherein each DCI is associated with a Demodulation Reference Signal (DMRS) Port Group (DMRS-PG) of a plurality of DMRS-PGs, and each DCI signal within the plurality of DCI signals contains a DMRS-PG Identifier (DMRS-PGID) identifying the associated DMRS-PG, code for performing one or more measurements associated with the each DCI, and code for generating a multi-port-group uplink control information (UCI) signal based on the one or more measurements associated with the each DCI, wherein the multi-port-group UCI signal contains an indication of whether the each DCI is successfully received.

In accordance with aspects of the disclosure, another non-transitory computer-readable medium comprising at least one instruction for causing a processor to perform operations is provided. The non-transitory computer-readable medium comprises code for generating a plurality of downlink control information (DCI) signals that schedule a user equipment (UE) for uplink transmission of uplink control information (UCI), wherein each DCI signal contains a Demodulation Reference Signal Port Group Identifier (DMRS-PGID) associated with a unique Demodulation Reference Signal Port Group (DMRS-PG) of a plurality of DMRS-PGs, code for transmitting the DCI signals to the UE, code for receiving a multi-port-group UCI signal from the UE, wherein the multi-port-group UCI signal includes feedback information scheduled by the successfully received DCIs of the transmitted plurality of DCI signals, as well as indications on whether the transmitted DCI signals are successfully received by the UE, code for processing the multi-port-group UCI signal to determine association between the feedback information and the successful reception of each transmitted DCI signal.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Various aspects described herein generally relate to systems and methods for multi-port-group UCI signaling. As noted above, a previous technique, in which a UE may provide feedback information to a plurality of network element from which it receives DCI, may result in increased overhead within the wireless communication system and increased power consumption at the UE. In accordance with aspects of the disclosure, a UE may be equipped to generate a multi-port-group UCI signal that includes feedback information relating to a plurality of DMRS-PGs. Each DCI transmitted to the UE may be associated with a particular DMRS-PG and may contain a corresponding DMRS-PGID. The UE may be configured to generate a multi-port-group UCI signal in accordance with aspects of the disclosure. Moreover, the multi-port-group UCI signal may be generated in a particular manner such that a network entity can process the multi-port-group UCI signal to locate specific feedback information associated with any particular DMRS-PG.

As will be discussed in greater detail below, there are several suitable approaches for generating (at the UE) and processing (at the network entity) the multi-port-group UCI signal of the present disclosure. In some implementations, the multi-port-group UCI signal may include a feedback payload corresponding to a plurality of DMRS-PGs and a multi-port-group UCI bitmap that explicitly indicates which DMRS-PGIDs are represented in the feedback payload. Once the multi-port-group UCI signal has been provided to the network entity, the network entity may consult the multi-port-group UCI bitmap to find an explicit indicator as to whether the multi-port-group UCI signal include feedback information relevant to a particular DMRS-PG (as well as where to find it within the feedback payload).

Additionally or alternatively, the multi-port-group UCI signal may be scrambled one or more times in accordance with one or more scrambling sequences. The one or more scrambling sequences may correspond to the DMRS-PGIDs of the DMRS-PGs for which relevant feedback information has been included, and the feedback information may be scrambled and re-scrambled in accordance with a particular scrambling order. The scrambling may therefore constitute an implicit indicator of which DMRS-PGs have relevant feedback information provided in the multi-port-group UCI signal. Once the multi-port-group UCI signal has been provided to a network entity, the network entity may try different scrambling sequences to find the implicit indicators.

Figure 1:
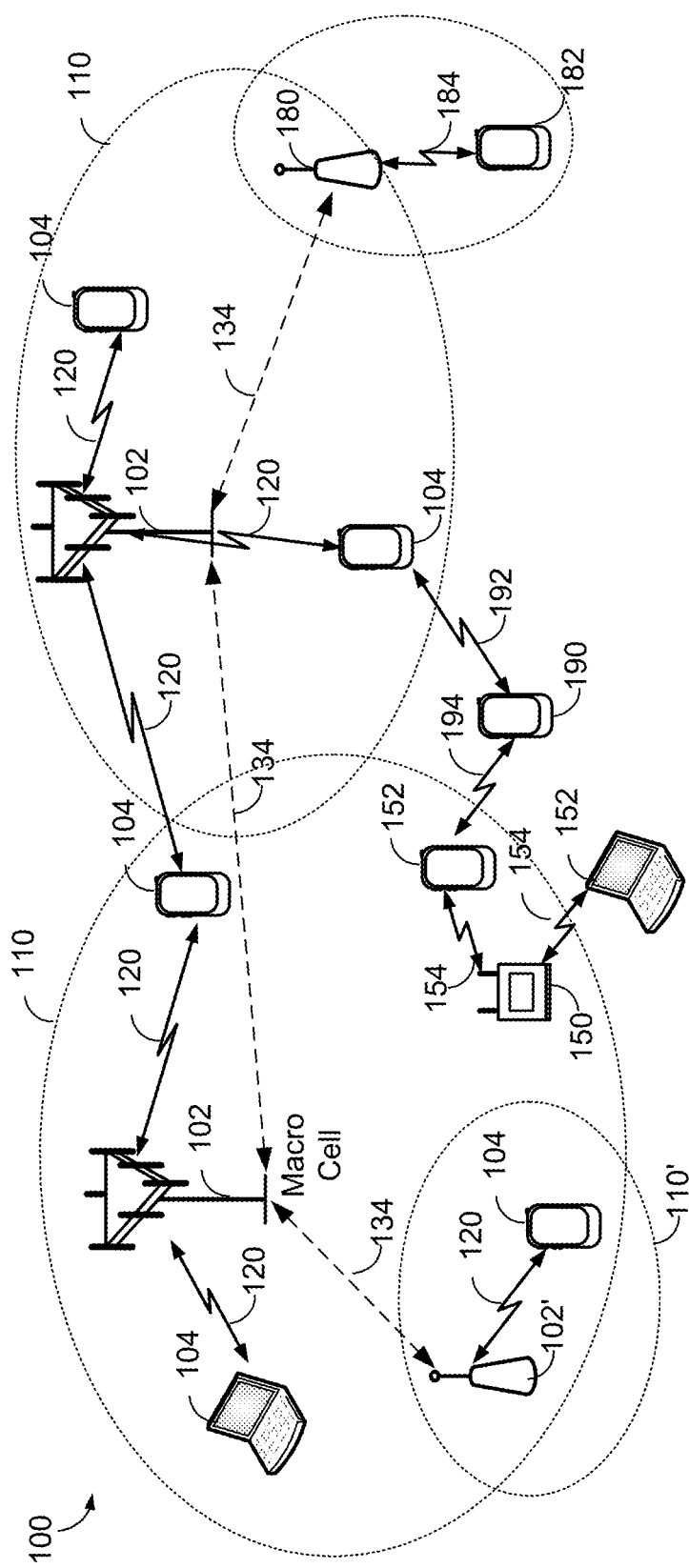
FIG. 1 generally illustrates an exemplary wireless communications system.

FIG. 1 generally illustrates an exemplary wireless communications system 100. The wireless communications system 100 (which may also be referred to as a wireless wide area network (WWAN)) may include one or more instances of a base station 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of thirty GHz to three-hundred GHz and a wavelength between one millimeter and ten millimeters. Radio waves in this band may be referred to as a millimeter wave. Near mmW may extend down to a frequency of three GHz with a wavelength of one-hundred millimeters. The super high frequency (SHF) band extends between three GHz and thirty GHz, and may also be referred to as a centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The term "network entity" may refer to one or more of the base stations 102, the small cell base station 102', the mmW base station 180, or a remote radio head (RRH) (not shown in FIG. 1).

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2:
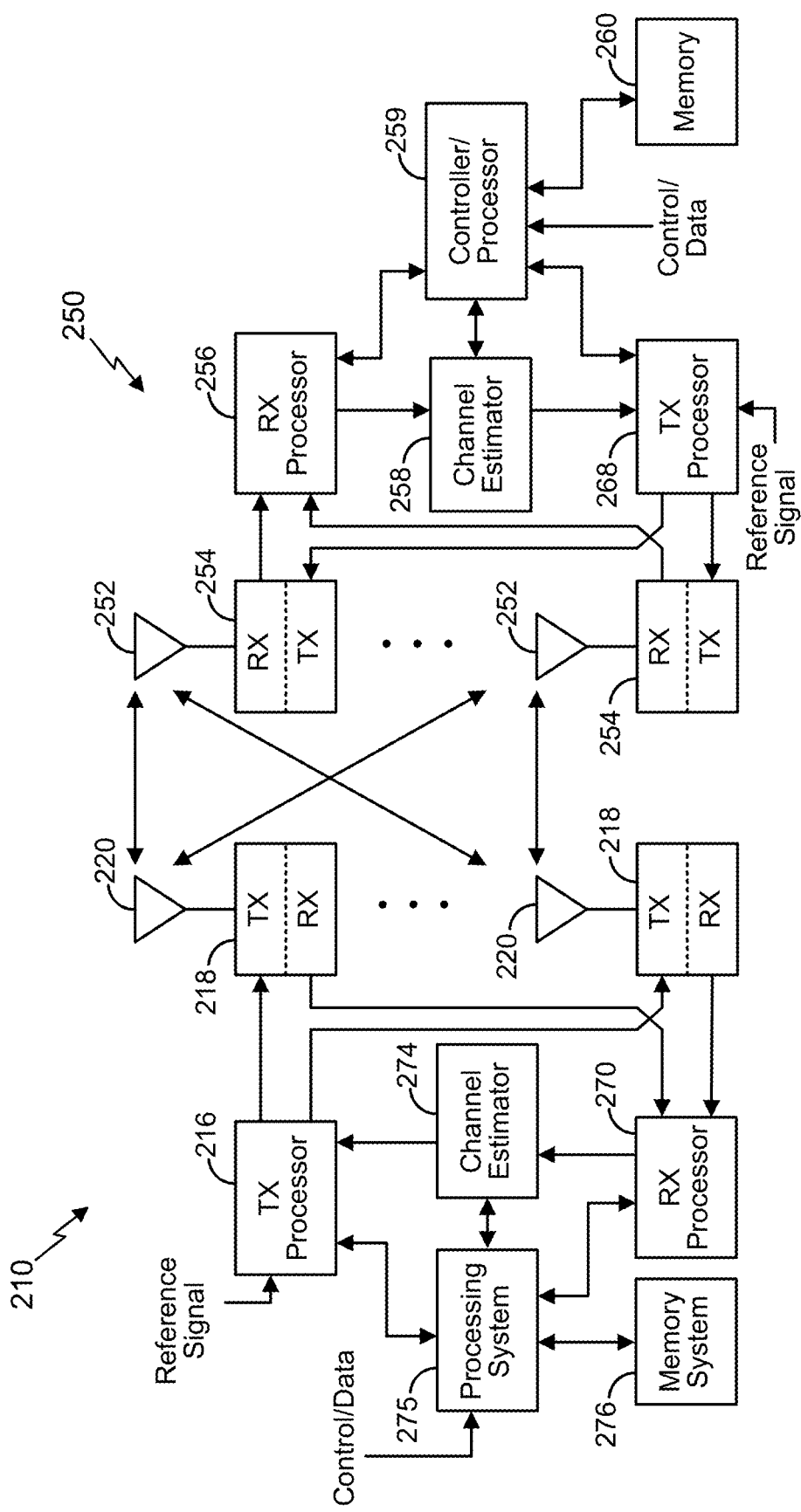
FIG. 2 generally illustrates an exemplary DMRS-PGs in communication with an exemplary UE in a wireless network.

According to various aspects, FIG. 2 illustrates an exemplary base station 210 in communication with an exemplary UE 250 in a wireless network. The base station 210 may be a network entity and may comprise, for example, an eNB, a gNB, a small cell AP, a WLAN AP, or any other suitable device. The base station 210 may comprise a Demodulation Reference Signal (DMRS) Port Group (DMRS-PG) having a particular DMRS-PG Identifier (DMRS-PGID). In the DL, IP packets from the core network may be provided to a processing system 275. The processing system 275 implements functionality for a radio resource control (RRC) layer, a packet data convergence protocol (PDCP) layer, a radio link control (RLC) layer, and a medium access control (MAC) layer. The processing system 275 provides RRC layer functionality associated with broadcasting of system information (e.g., MIB, SIBs), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 216 and the receive (RX) processor 270 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to one or more different antennas 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the RX processor 256. The TX processor 268 and the RX processor 256 implement Layer-1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and de-interleaved to recover the data and control signals that were originally transmitted by the base station 210 on the physical channel. The data and control signals are then provided to the processing system 259, which implements Layer-3 and Layer-2 functionality.

The processing system 259 can be associated with a memory system 260 that stores program codes and data. The memory system 260 may be referred to as a computer-readable medium. In the UL, the processing system 259 provides demultiplexing between transport and logical channels, packet reassembly, deciphering, header decompression, and control signal processing to recover IP packets from the core network. The processing system 259 is also responsible for error detection.

Similar to the functionality described in connection with the DL transmission by the base station 210, the processing system 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission.

The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The processing system 275 can be associated with a memory system 276 that stores program codes and data. The memory system 276 may be referred to as a computer-readable medium. In the UL, the processing system 275 provides demultiplexing between transport and logical channels, packet reassembly, deciphering, header decompression, control signal processing to recover IP packets from the UE 250. IP packets from the processing system 275 may be provided to the core network. The processing system 275 is also responsible for error detection.

Figure 3:
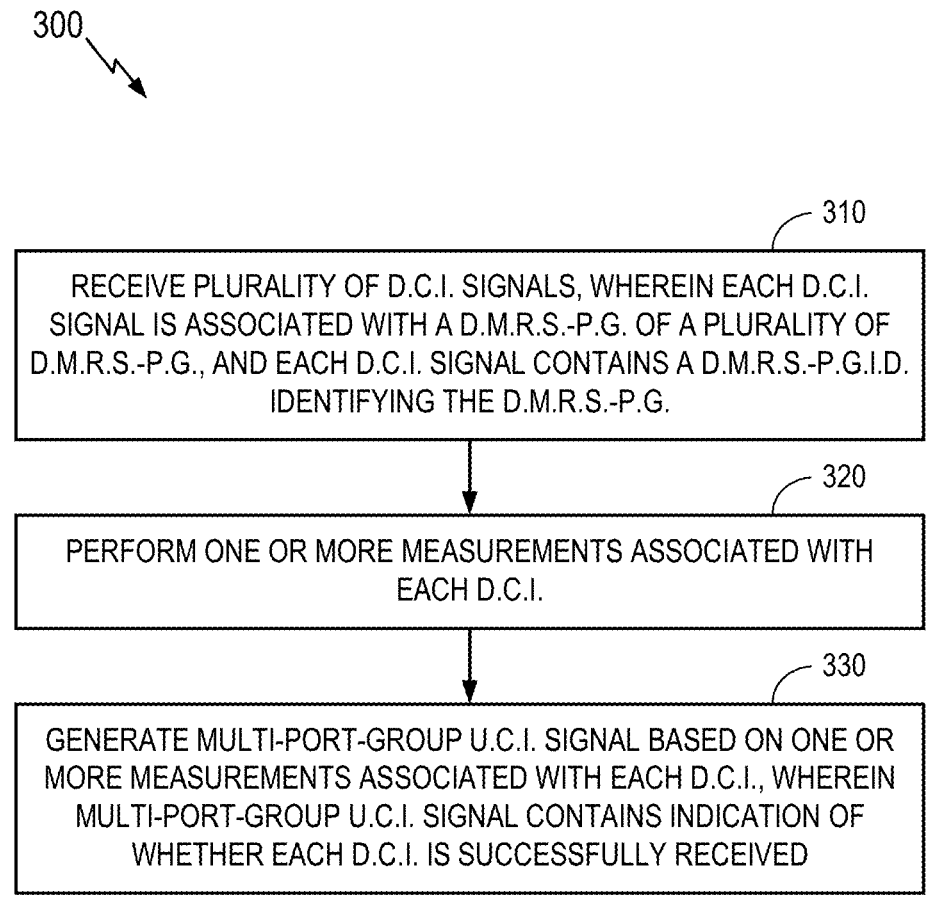
FIG. 3 generally illustrates a method for generating a multi-port-group UCI signal in accordance with aspects of the disclosure.

FIG. 3 generally illustrates a method 300 for generating a multi-port-group UCI signal in accordance with aspects of the disclosure. The method 300 may be performed by, for example, the UE 250 depicted in FIG. 2, or any other UE described in the present application.

At 310, the UE 250 receives a plurality of DCI signals, wherein each DCI signal is associated with a DMRS-PG of a plurality of DMRS-PGs and each DCI signal contains a DMRS-PGID identifying the DMRS-PG. The receiving at 310 may be performed by, for example, one or more of the elements depicted in FIG. 2, for example, one or more of the antennas 252, one or more of the receivers 254RX, the RX processor 256, or any combination thereof. Accordingly, the any combination thereof may constitute means for receiving a plurality of DCI signals, wherein each DCI signal is associated with a DMRS-PG of a plurality of DMRS-PGs and each DCI signal contains a DMRS-PGID.

At 320, the UE 250 performs one or more measurements associated with each DCI signal. The performing at 320 may be performed by, for example, one or more of the elements depicted in FIG. 2, for example, the channel estimator 258, the processing system 259, the memory system 260, or any combination thereof. Accordingly, the any combination thereof may constitute means for performing one or more measurements associated with each DCI signal.

At 330, the UE 250 generates a multi-port-group UCI signal based on the one or more measurements associated with each DCI signal, wherein the multi-port-group UCI signal contains an indication of whether each DCI is successfully received. The generating at 330 may be performed by, for example, one or more of the elements depicted in FIG. 2, for example, the channel estimator 258, the processing system 259, the memory system 260, or any combination thereof. Accordingly, the any combination thereof may constitute means for generating a multi-port-group uplink control information (UCI) signal based on the one or more measurements associated with each DCI signal, wherein the multi-port-group UCI signal contains an indication of whether each DCI is successfully received.

The generating at 330 may be performed in the manner described below with respect to FIG. 7. Additionally or alternatively, the generating at 330 may be performed in the manner described below with respect to FIG. 10. By transmitting a multi-port-group UCI signal containing feedback information relating to a plurality of DMRS-PGs, the method 300 may reduce overhead relative to a system in which an individual UCI signal is sent to each particular base station. Additionally or alternatively, the UE 250 may consume less power by transmitting a single multi-port-group UCI signal rather than multiple different UCI signals.

Figure 4:
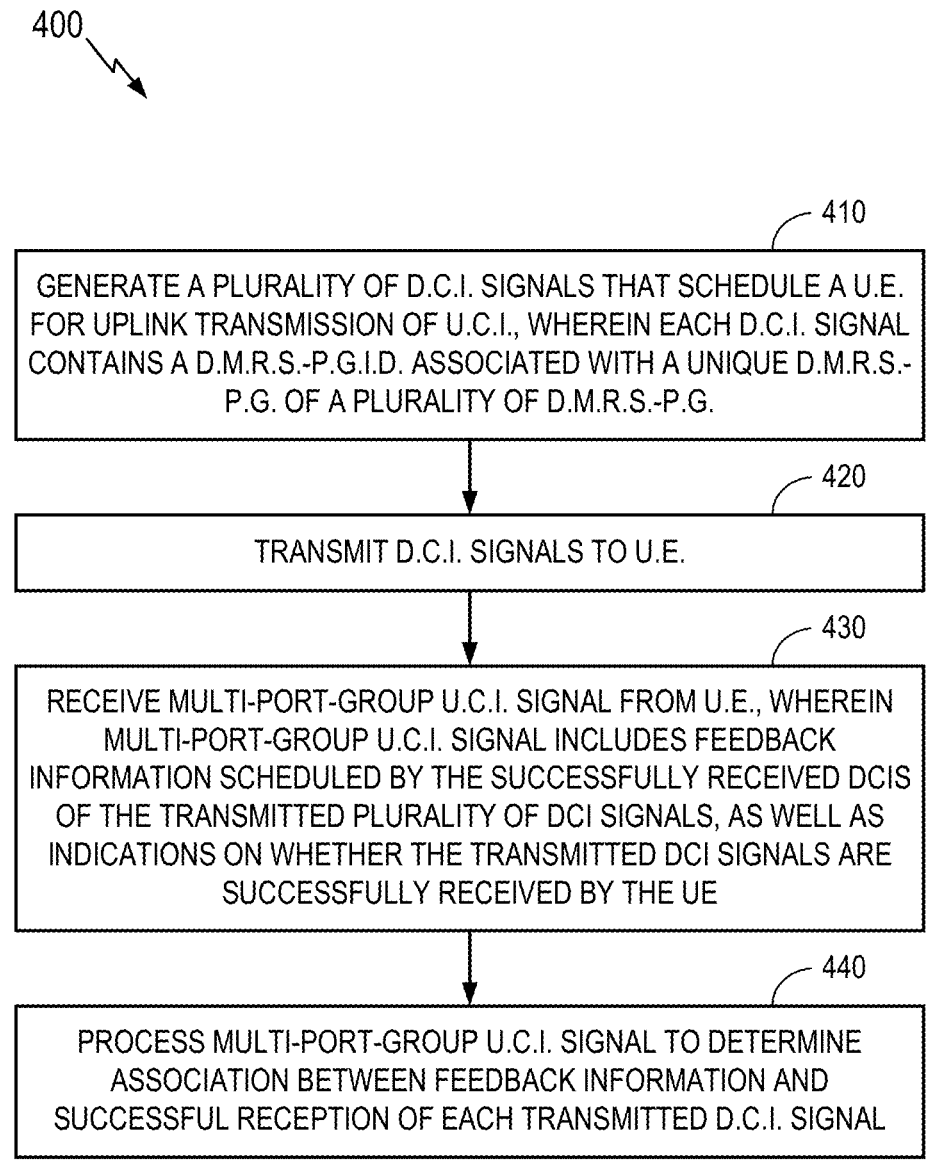
FIG. 4 generally illustrates a method for processing a multi-port-group UCI signal in accordance with aspects of the disclosure.

FIG. 4 generally illustrates a method 400 for processing a multi-port-group UCI signal in accordance with aspects of the disclosure. The method 400 may be performed by, for example, the base station 210 depicted in FIG. 2, or any other DMRS-PG described in the present application.

At 410, the base station 210 generates a plurality of DCI signals that schedule a UE for uplink transmission of UCI, wherein each DCI signal contains a DMRS-PGID associated with a unique DMRS-PG of a plurality of DMRS-PGs. The generating at 410 may be performed by, for example, one or more of the elements depicted in FIG. 2, for example, the processing system 275, the memory system 276, or any combination thereof. Accordingly, the any combination thereof may constitute means for generating a plurality of DCI signals that schedule a UE for uplink transmission of UCI, wherein each DCI signal contains a DMRS-PGID associated with a unique DMRS-PG of a plurality of DMRS-PGs.

At 420, the base station 210 transmits the DCI signals to the UE. The transmitting at 420 may be performed by, for example, one or more of the elements depicted in FIG. 2, for example, one or more of the antennas 220, one or more of the transmitters 218TX, the TX processor 216, or any combination thereof. Accordingly, the any combination thereof may constitute means for transmitting the DCI signals to the UE.

At 430, the base station 210 receives a multi-port-group UCI signal from the UE, wherein the multi-port-group UCI signal includes feedback information scheduled by the successfully received DCIs of the transmitted plurality of DCI signals, as well as indications on whether the transmitted DCI signals are successfully received by the UE. The receiving at 430 may be performed by, for example, one or more of the elements depicted in FIG. 2, for example, one or more of the antennas 220, one or more of the receivers 218RX, the RX processor 270, or any combination thereof. Accordingly, the any combination thereof may constitute means for receiving a multi-port-group UCI signal from the UE, wherein the multi-port-group UCI signal includes feedback information scheduled by the successfully received DCIs of the transmitted plurality of DCI signals, as well as indications on whether the transmitted DCI signals are successfully received by the UE.

At 440, the base station 210 processes the multi-port-group UCI signal to determine association between the feedback information and the successful reception of each transmitted DCI signal. The processing at 440 may be performed by, for example, one or more of the elements depicted in FIG. 2, for example, the processing system 275, the memory system 276, or any combination thereof. Accordingly, the any combination thereof may constitute means for processing the multi-port-group UCI signal to determine association between the feedback information and the successful reception of each transmitted DCI signal.

The processing at 440 may be performed in the manner described below with respect to FIG. 8. Additionally or alternatively, the processing at 440 may be performed in the manner described below with respect to FIG. 11.

As noted above, the UE 250 may reduce system overhead and power consumption by transmitting a multi-port-group UCI signal containing feedback information relating to a plurality of DMRS-PGs in accordance with the method 300 depicted in FIG. 3. It will be understood that these advantages may only be obtained if the base station 210 is configured to correctly interpret the multi-port-group UCI signal, for example, by implementing the method 400 depicted in FIG. 4.

Figure 5A:
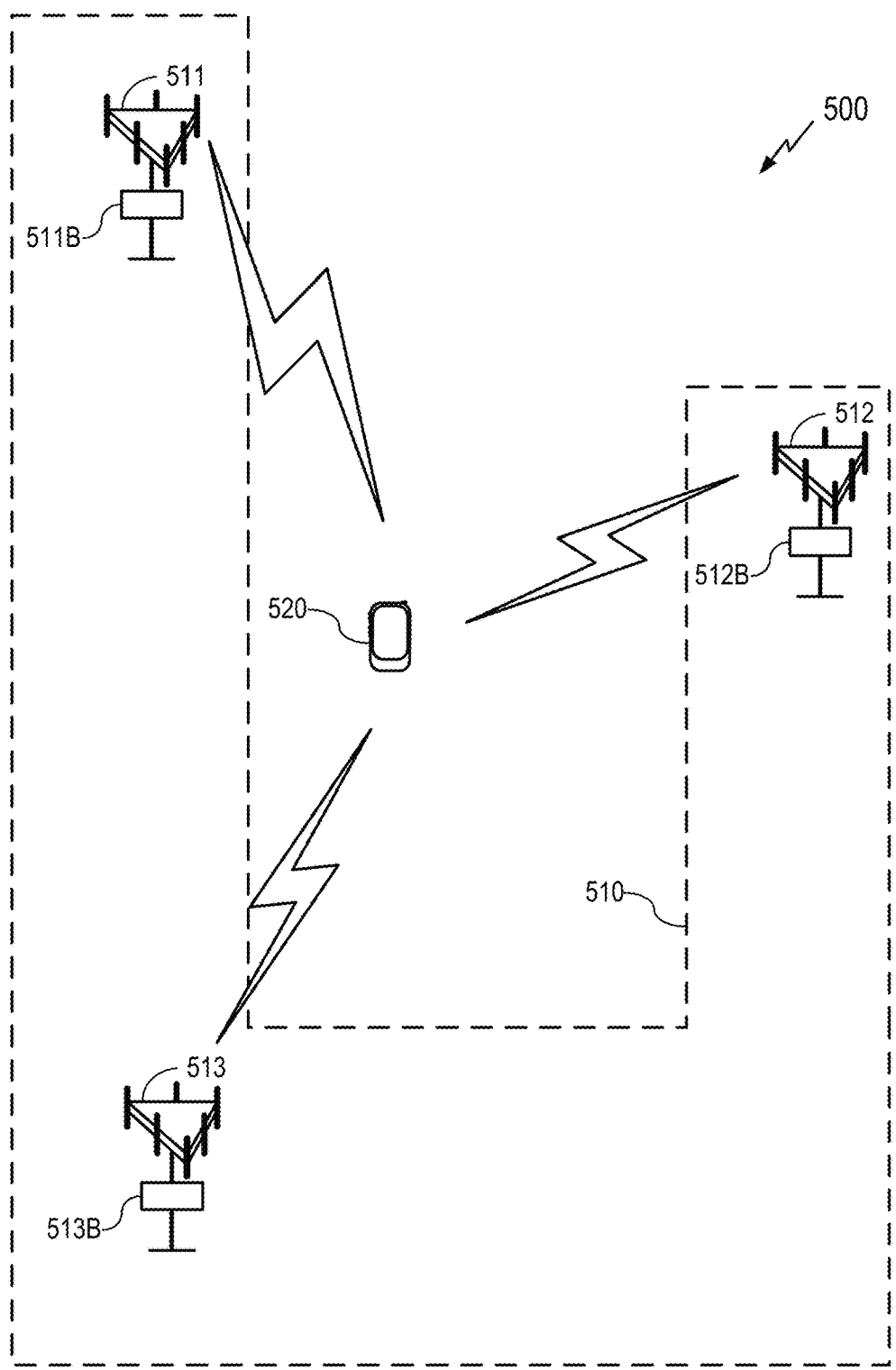
FIG. 5A generally illustrates an exemplary wireless communications system that includes a plurality of DMRS-PGs and a UE.

FIG. 5A generally illustrates an exemplary wireless communication system 500 that includes a network 510 comprising a plurality of Transmission Reception Points (TRPs) 511, 512, 513 and a UE 520.

Each of the three TRPs 511, 512, 513 may correspond to one or more elements of the wireless communications system 100 depicted in FIG. 1. In the particular example depicted in FIG. 5A, the TRPs 511, 512, 513 are depicted as macro-cell base stations analogous to the base stations 102 depicted in FIG. 1. However, it will be understood that this is for illustrative purposes and that the TRPs 511, 512, 513 depicted in FIG. 5A, or any subset thereof, may correspond to any suitable DMRS-PG, for example, the base stations 102, the small cell base station 102', the mmW base station 180, the base station 210 depicted in FIG. 2, or a remote radio head (RRH) (not shown in FIGS. 1-2). Although three TRPs are depicted in FIG. 5A, it will be understood that any number of TRPs may constitute the plurality, for example, two TRPs, three TRPs, four TRPs, etc. In addition, the wireless communication system 500 may include other elements not depicted for clarity of illustration. The UE 520 may correspond to one or more elements of the wireless communications system 100, for example, one or more of the UEs 104 or WLAN STAs 152, and/or the UE 250 depicted in FIG. 2.

Each of the TRPs 511, 512, 513 may be associated with a respective DMRS-PG 511B, 512B, 513B. Each of the DMRS-PGs 511B, 512B, 513B may be associated with a respective DMRS-PG identifier (DMRS-PGID). In some implementations, the TRPs 511, 512, 513 may participate in non-coherent joint transmission (NCJT). In NCJT implementation, the plurality of TRPs 511, 512, 513 may jointly transmit the same data to the UE 520. Joint transmission of the same data may result in increased reception power at the UE 520, and may be particularly useful in wireless communication systems that have sufficient capacity for joint transmission of the same data.

Figure 5B:
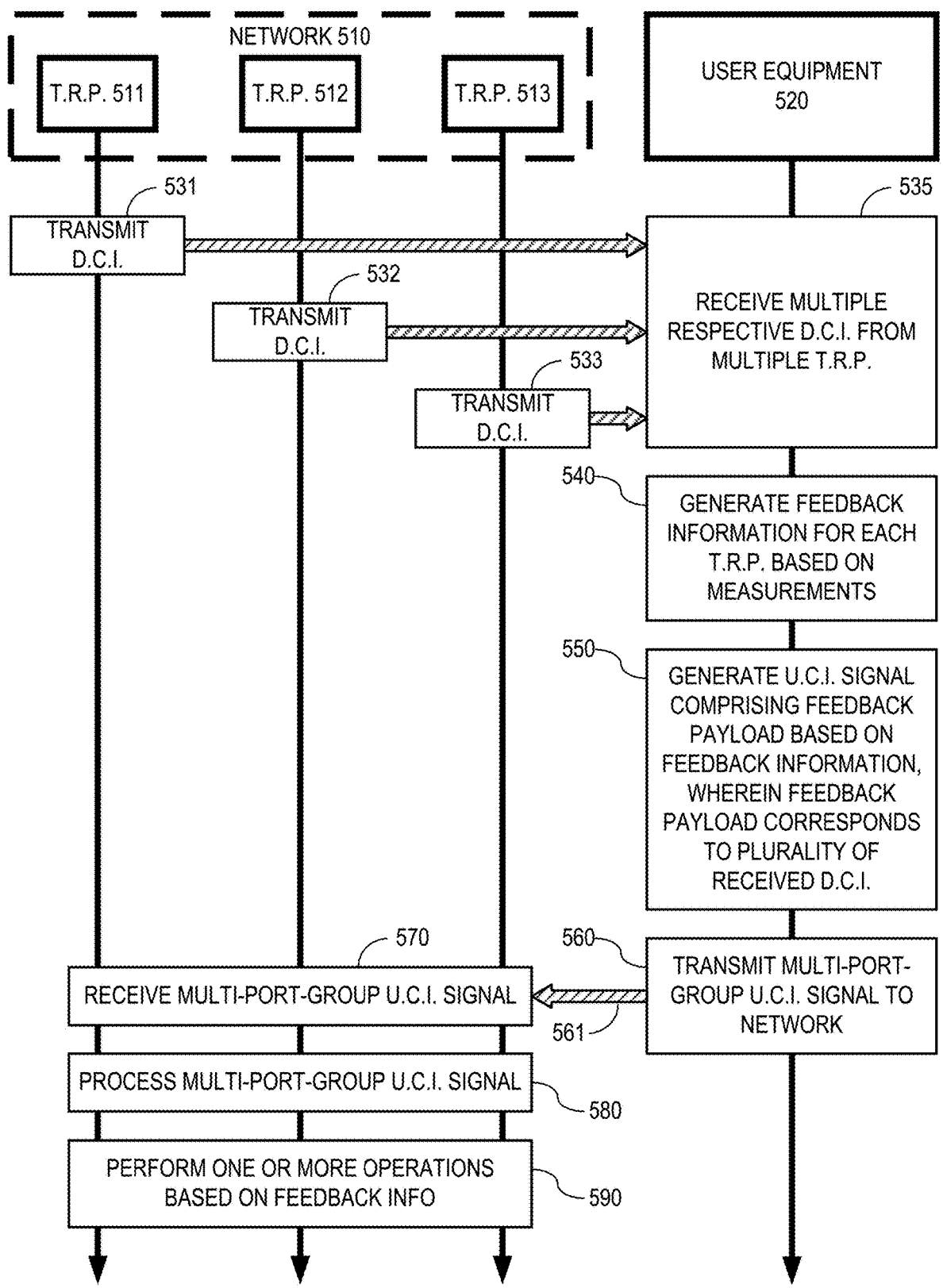
FIG. 5B generally illustrates a signal flow diagram showing various communications within the wireless communication system depicted in FIG. 5A.

FIG. 5B generally illustrates a signal flow diagram showing various communications within the wireless communication system 500 depicted in FIG. 5A. The communications may be between the network 510 (i.e., one or more of the plurality of TRPs 511, 512, 513) and the UE 520. When the UE 520 performs the method 300 and one or more of the TRPs 511, 512, 513 perform the method 400, the signal flow depicted in FIG. 5B may be the result.

As shown in FIG. 5B, each of the TRPs 511, 512, 513 may transmit downlink control information (DCI) to the UE 520. Each of the TRPs 511, 512, 513 may transmit its own respective DCI, wherein each DCI may contain a DMRS-PG identifier (DMRS-PGID) to indicate the DMRS-PG associated with the TRP. For example, the TRP 511 may transmit DCI 531 containing DMRS-PGID for DMRS-PG 511B, the TRP 512 may transmit DCI 532 containing DMRS-PGID for DMRS-PG 512B, and the TRP 513 may transmit DCI 533 containing DMRS-PGID for DMRS-PG 513B.

At 535, the UE 520 may receive DCI from multiple TRPs 511, 512, 513. The UE 520 may use the DCI to, for example, determine a schedule for the Physical Downlink Shared Channel (PDSCH) and/or the Physical Uplink Control Channel (PUCCH), or use the DCI for any other suitable purpose. The UE 520 may then perform certain measurements on various signals received from each particular DMRS-PG. The measurements may be used to generate feedback information associated with the particular DMRS-PG.

At 540, for each TRP from which DCI was received, the UE 520 may generate feedback information associated with the corresponding DMRS-PG associated to the TRP.

At 550, the UE 520 may generate distinct feedback information for each of the plurality of DMRS-PGs 511B, 512B, 513B and use the feedback information for each of the plurality of DMRS-PGs 511B, 512B, 513B to generate a single feedback payload. The single feedback payload may be packaged within a single UCI signal. This single UCI signal, which contains feedback information corresponding to a plurality of DMRS-PGs 511B, 512B, 513B, may be referred to as a multi-port-group UCI signal 561. As will be discussed in greater detail below, the generating at 550 of the multi-port-group UCI signal 561 may be performed in accordance with particular rules and/or algorithms that configure the multi-port-group UCI signal 561 so as to ensure that a particular TRP associated with a certain DMRS-PG is able to locate and obtain its corresponding feedback information and/or discard feedback information corresponding to one or more other TRPs associated with one or more other DMRS-PGs.

At 560, the UE 520 may transmit, to the network 510 (i.e., one or more network entities), the multi-port-group UCI signal 561 generated at 550.

At 570, the network 510 receives the multi-port-group UCI signal 561 transmitted by the UE 520. At 580, the network 510 processes the multi-port-group UCI signal 561 received at 570. As will be discussed in greater detail below, the processing at 580 of the multi-port-group UCI signal 561 received at 570 may be different from the processing of a conventional UCI signal corresponding to a single transmitter of DCI. In particular, because the multi-port-group UCI signal 561 may include feedback associated with a plurality of DMRS-PGs 511B, 512B, 513B, the processing at 580 may include rules and/or algorithms that enable a particular TRP to locate its corresponding feedback information by checking if the feedback information associated with its corresponding DMRS-PG is included, and/or discard feedback information corresponding to one or more other TRPs, as will be discussed in greater detail below.

At 590, the one or more of the plurality of TRPs 511, 512, 513 that receives and processes the multi-port-group UCI signal 561 performs one or more operations based on the corresponding feedback information. For example, the feedback information may comprise one or more of Channel Status Information (CSI), Hybrid Automatic Repeat Request (HARQ) information, scheduling requests, or any other suitable information. The one or more operations performed at 590 may depend on what type of information was received and processed as well as what the information indicated. Accordingly, CSI may indicate that current transmission parameters are not optimized, and in response, the one or more of the plurality of TRPs 511, 512, 513 may adjust one or more transmission parameters associated with communication between the UE 520 and the one or more of the plurality of TRPs 511, 512, 513. Moreover, HARQ information may indicate whether a recent communication was successfully received or not, and in response, the one or more of the plurality of TRPs 511, 512, 513 may transmit new data (for example, in response to an ACK indication) or re-transmit previously communicated data (for example, in response to a NACK indication). Moreover, a scheduling request may indicate that the UE 520 desires to communicate via uplink, downlink, or both, and in response, the one or more of the plurality of TRPs 511, 512, 513 may modify the schedule to include an uplink transmission associated with the UE 520, a downlink transmission to the UE 520, or both.

Figure 6:
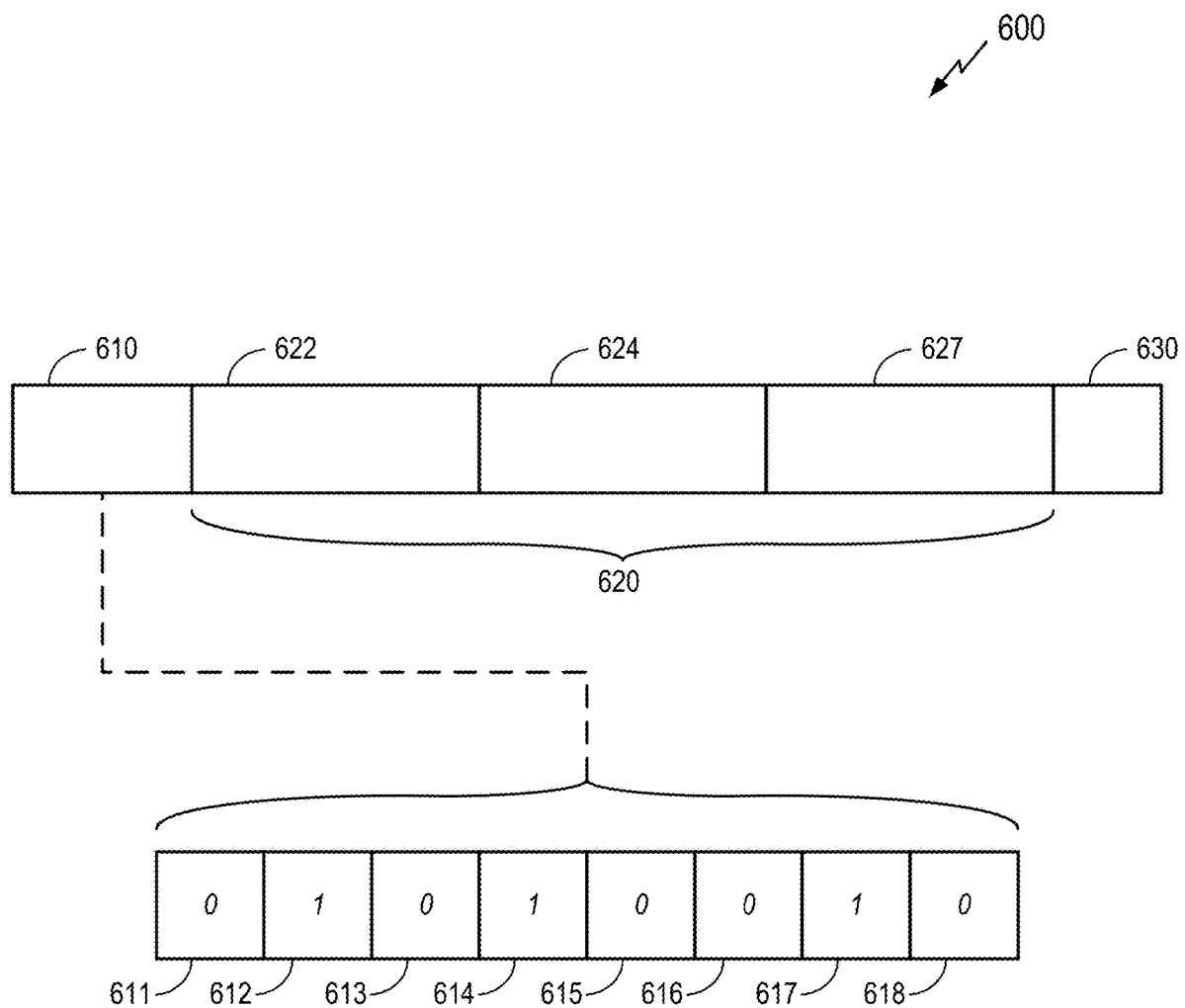
FIG. 6 generally illustrates a multi-port-group UCI signal in accordance with aspects of the disclosure.

FIG. 6 generally illustrates a multi-port-group UCI signal 600 in accordance with aspects of the disclosure. The multi-port-group UCI signal 600 depicted in FIG. 6 may correspond to the multi-port-group UCI signal 561 depicted in FIG. 5B. The multi-port-group UCI signal 600 may be generated by the UE 520 based on DCIs received from the TRPs 511, 512, 513. The multi-port-group UCI signal 600 may also be received by the network 510 and processed to obtain feedback information relating to communications between one or more particular TRPs and the UE 520.

The multi-port-group UCI signal 600 may include a multi-port-group UCI bitmap 610, a feedback payload 620, and other data 630. The multi-port-group UCI bitmap 610 may include a first bitmap portion 611, a second bitmap portion 612, a third bitmap portion 613, a fourth bitmap portion 614, a fifth bitmap portion 615, a sixth bitmap portion 616, a seventh bitmap portion 617, and an eighth bitmap portion 618. Each of the bitmap portions 611-618 respectively may correspond to a particular DMRS-PGID. In this particular example, the multi-port-group UCI bitmap 610 has eight portions and can therefore store indicator data relating to eight different DMRS-PGIDs. However, it will be understood that although the multi-port-group UCI bitmap 610 depicted in FIG. 6 comprises eight bitmap portions 611-618 for illustrative purposes, the size of the bitmap portion may vary so as to store indicator data relating to any number of DMRS-PGIDs. The total number of DMRS-PGs within the plurality of DMRS-PGs may be obtained by the UE based at least on an RRC configuration, and/or a separate DCI indication, and/or system information broadcasting, wherein the total number of portions within the multi-port-group UCI signal bitmap 610 may be equal to the total number of DMRS-PGs within the plurality of DMRS-PGs.

In the present example, there are eight TRPs from which DCI may be received, where each TRP is associated with its DMRS-PG, and each of the eight DMRS-PGs may have a corresponding DMRS-PGID. The DMRS-PGIDs may be assigned by a wireless protocol from a network entity connecting these TRPs, to each TRP before they send out DCI signals. The UE 520 may be configured to store a list of the DMRS-PGIDs and sort the list in accordance with, for example, an ascending order, a descending order, a predetermined order set by the network or a relevant technical standard, or any other suitable order. In the present example, for purposes of illustration, the eight DMRS-PGIDs may range from '1' to '8'. In the present example, the eight DMRS-PGIDs are sorted in ascending order from '1' to '8' and correspond to the eight bitmap portions 611-618, respectively.

In the present example, each of the eight bitmap portions 611-618 includes a single bit which may be set to either a first value '1' indicating that DCI was received or a second value '0' indicating that DCI was not received. As will be understood from FIG. 6, the first bitmap portion 611, the third bitmap portion 613, the fifth bitmap portion 615, the sixth bitmap portion 616, and the eighth bitmap portion 618 are all set to '0', indicating that the UE 520 did not receive DCI relating to the DMRS-PGs associated with the DMRS-PGIDs '1', '3', '5', '6', or '8'. Moreover, the second bitmap portion 612, the fourth bitmap portion 614, and the seventh bitmap portion 617 are each set to '1', indicating that the UE 520 did receive DCI from the DMRS-PGs associated with the DMRS-PGIDs '2', '4', and '7'. Although the present example uses '1' to indicate that DCI was received and '0' to indicate that it is not, it will be understood that these values may be arbitrarily selected.

As noted above, the multi-port-group UCI signal 600 may further include the feedback payload 620. The feedback payload in a conventional UCI signal may include feedback information relating to a particular base station. By contrast, the feedback payload 620 depicted in FIG. 6 may include feedback information relating to any number of DMRS-PGs (for example, eight). In the present example, the feedback payload 620 includes first feedback information 622 relating to DMRS-PGID '2', second feedback information 624 relating to DMRS-PGID '4', and third feedback information 627 relating to DMRS-PGID '7'.

As noted above, the multi-port-group UCI signal 600 may further include other data 630. The other data 630 may include header information or any other data suitable for a UCI Signal. Although the multi-port-group UCI bitmap 610, the feedback payload 620, and the other data 630 are depicted as having a particular size and in a particular order, it will be understood that this is purely for illustrative purposes. It will be understood that the multi-port-group UCI bitmap 610, the feedback payload 620, the other data 630, or any components thereof may have any suitable size and may be provided within the multi-port-group UCI signal 600 in any order.

Any network entity that receives the multi-port-group UCI signal 600 (for example, the TRP 511) may process the multi-port-group UCI signal 600 by obtaining the multi-port-group UCI bitmap 610 from the multi-port-group UCI signal 600 and processing the multi-port-group UCI bitmap 610 to determine whether the multi-port-group UCI signal 600 includes feedback information relating to a particular DMRS-PG.

As an example, suppose that the TRP 511 is associated with the DMRS-PGID '4'. The network entity (network 510 or one or more elements thereof) may receive the multiport-group UCI signal 600, obtain the multi-port-group UCI bitmap 610 from the multi-port-group UCI signal 600, and (using the multi-port-group UCI bitmap 610) determine if the multi-port-group UCI signal 600 includes feedback information relating to the TRP 511, or the associated DMRS-PG 511B. In particular, based on the fact that DMRS-PG 511 corresponds to DMRS-PGID '4', the network entity may locate the fourth bitmap portion 614 and determine that because the fourth bitmap portion 614 is set to '1', the feedback payload 620 includes feedback information relating to the TRP 511, or the associated DMRS-PG 511B. The network entity may also determine from the multi-port-group UCI bitmap 610 that the feedback payload 620 includes feedback information relating to other TRPs or the associated DMRS-PGs, in particular, the DMRS-PGs with DMRS-PGIDs '2' and '7'. Based on this information, the DMRS-PG 511 may determine that the first feedback information 622 corresponds to the DMRS-PG with DMRS-PGID '2', the second feedback information 624 corresponds to the DMRS-PG 511B, and that the third feedback information 627 corresponds to the DMRS-PG with DMRS-PGID '7'. Based on the determination that the second feedback information 624 corresponds to the DMRS-PG 511B, the network entity may obtain and process the second feedback information 624 to obtain UCI that relates to the DMRS-PG 511B.

The network entity may be further configured to share the multi-port-group UCI signal 600 with other network entities. Additionally or alternatively, the network entity may process the entirety of the feedback payload 620 and transmit the feedback information corresponding to a particular DMRS-PG to a network entity associated with that particular DMRS-PG. For example, the TRP 511 may determine that the DMRS-PG 512B and the DMRS-PG 513B respectively correspond to DMRS-PGIDs '2' and '7', and may provide via wireline backhaul, the first feedback information 622 to the network entity associated with the DMRS-PG 512B and the third feedback information 627 to the network entity associated with the DMRS-PG 513B.

It will be further understood that the multi-port-group UCI signal 600 may also be used to determine that DCI intended for the UE 520 was not received. For example, suppose that another DMRS-PG having the DMRS-PGID '6' transmits DCI to the UE 520. Suppose further that the network entity later receives the multi-port-group UCI signal 600. The network entity may determine based on the multi-port-group UCI bitmap 610 (which includes a sixth bitmap portion 616 set to '0') that the DCI transmitted to the UE 520 was not received by the UE 520. In response to this determination, the network entity associated with DMRS-PGID '6' may abandon future DCI transmissions, re-transmit the DCI again, and/or adjust the transmission parameters associated with future DCI to improve the likelihood of reception at the UE 520.

Figure 7:
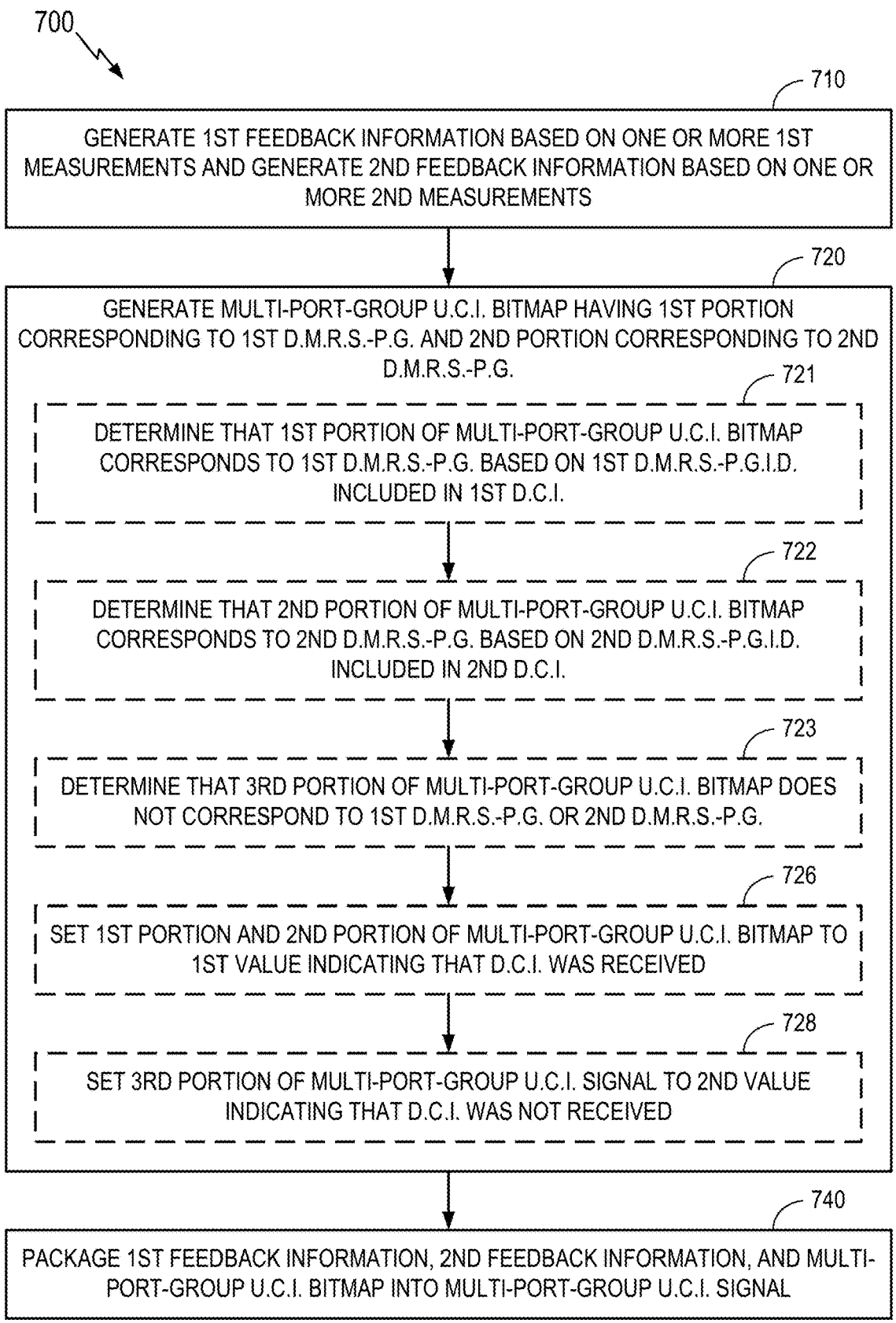
FIG. 7 generally illustrates a method for generating a multi-port-group UCI signal analogous to the multi-port-group UCI signal depicted in FIG. 6 in accordance with aspects of the disclosure.

FIG. 7 generally illustrates a method 700 for generating a multi-port-group UCI signal analogous to the multi-port-group UCI signal 600 depicted in FIG. 6 in accordance with aspects of the disclosure. The method 700 may be used to practice the generating at 330 depicted in FIG. 3. The method 700 may be performed by, for example, the UE 520 depicted in FIG. 5A.

As noted above with respect to FIG. 3, the UE 520 may, at 310, receive a plurality of DCI signals. Accordingly, the UE 520 may receive a first DCI signal containing a first DMRS-PGID and a second DCI signal containing a second DMRS-PGID. Moreover, the one or more measurements performed at 320 may include one or more first measurements associated with a first DMRS-PG and one or more second measurements associated with a second DMRS-PG.

At 710, the UE 520 generates first feedback information based on the one or more first measurements and generates second feedback information based on the one or more second measurements. The generating at 710 may be performed by, for example, one or more of the elements depicted in FIG. 2, for example, the channel estimator 258, the processing system 259, the memory system 260, or any combination thereof. Accordingly, the any combination thereof may constitute means for generating first feedback information based on the one or more first measurements and generating second feedback information based on the one or more second measurements.

At 720, the UE 520 generates a multi-port-group UCI bitmap having a first portion corresponding to the first DMRS-PG and a second portion corresponding to the second DMRS-PG. The generating at 720 may be performed by, for example, one or more of the elements depicted in FIG. 2, for example, the processing system 259, the memory system 260, or any combination thereof. Accordingly, the any combination thereof may constitute means for generating a multi-port-group UCI bitmap having a first portion corresponding to the first DMRS-PG and a second portion corresponding to the second DMRS-PG.

At 740, the UE 520 packages the first feedback information, the second feedback information, and the multi-port-group UCI bitmap into the multi-port-group UCI signal. The packaging at 740 may be performed by, for example, one or more of the elements depicted in FIG. 2, for example, the processing system 259, the memory system 260, or any combination thereof. Accordingly, the any combination thereof may constitute means for packaging the first feedback information, the second feedback information, and the multi-port-group UCI bitmap into the multi-port-group UCI signal. The packaged multi-port-group UCI signal may be transmitted to the network 510.

In some implementations, the generating at 720 may be practiced as described below. At 721, the UE 520 determines that the first portion of the multi-port-group UCI bitmap corresponds to the first DMRS-PG based on a first DMRS-PGID included in the first DCI. The determining at 721 may be performed by, for example, one or more of the elements depicted in FIG. 2, for example, the processing system 259, the memory system 260, or any combination thereof. Accordingly, the any combination thereof may constitute means for determining that the first portion of the multi-port-group UCI bitmap corresponds to the first DMRS-PG based on a first DMRS-PGID included in the first DCI.

At 722, the UE 520 determines that the second portion of the multi-port-group UCI bitmap corresponds to the second DMRS-PG based on a second DMRS-PGID included in the second DCI. The determining at 722 may be performed by, for example, one or more of the elements depicted in FIG. 2, for example, the processing system 259, the memory system 260, or any combination thereof. Accordingly, the any combination thereof may constitute means for determining that the second portion of the multi-port-group UCI bitmap corresponds to the second DMRS-PG based on a second DMRS-PGID included in the second DCI.

At 723, the UE 520 determines that a third portion of the multi-port-group UCI bitmap does not correspond to the first DMRS-PG or the second DMRS-PG. The determining at 723 may be performed by, for example, one or more of the elements depicted in FIG. 2, for example, the processing system 259, the memory system 260, or any combination thereof. Accordingly, the any combination thereof may constitute means for determining that a third portion of the multi-port-group UCI bitmap does not correspond to the first DMRS-PG or the second DMRS-PG.

At 726, the UE 520 sets the first portion of the multi-port-group UCI bitmap and the second portion of the multi-port-group UCI bitmap to a first value indicating that DCI was received. The setting at 726 may be performed in response to the determinations at 721 and 722. The setting at 726 may be performed by, for example, one or more of the elements depicted in FIG. 2, for example, the processing system 259, the memory system 260, or any combination thereof. Accordingly, the any combination thereof may constitute means for setting the first portion of the multi-port-group UCI bitmap and the second portion of the multi-port-group UCI bitmap to a first value indicating that DCI was received.

At 728, the UE 520 sets the third portion of the multi-port-group UCI signal to a second value indicating that DCI was not received. The setting at 728 may be performed in response to the determinations at 723. The setting at 728 may be performed by, for example, one or more of the elements depicted in FIG. 2, for example, the processing system 259, the memory system 260, or any combination thereof. Accordingly, the any combination thereof may constitute means for setting the third portion of the multi-port-group UCI signal to a second value indicating that DCI was not received.

Figure 8:
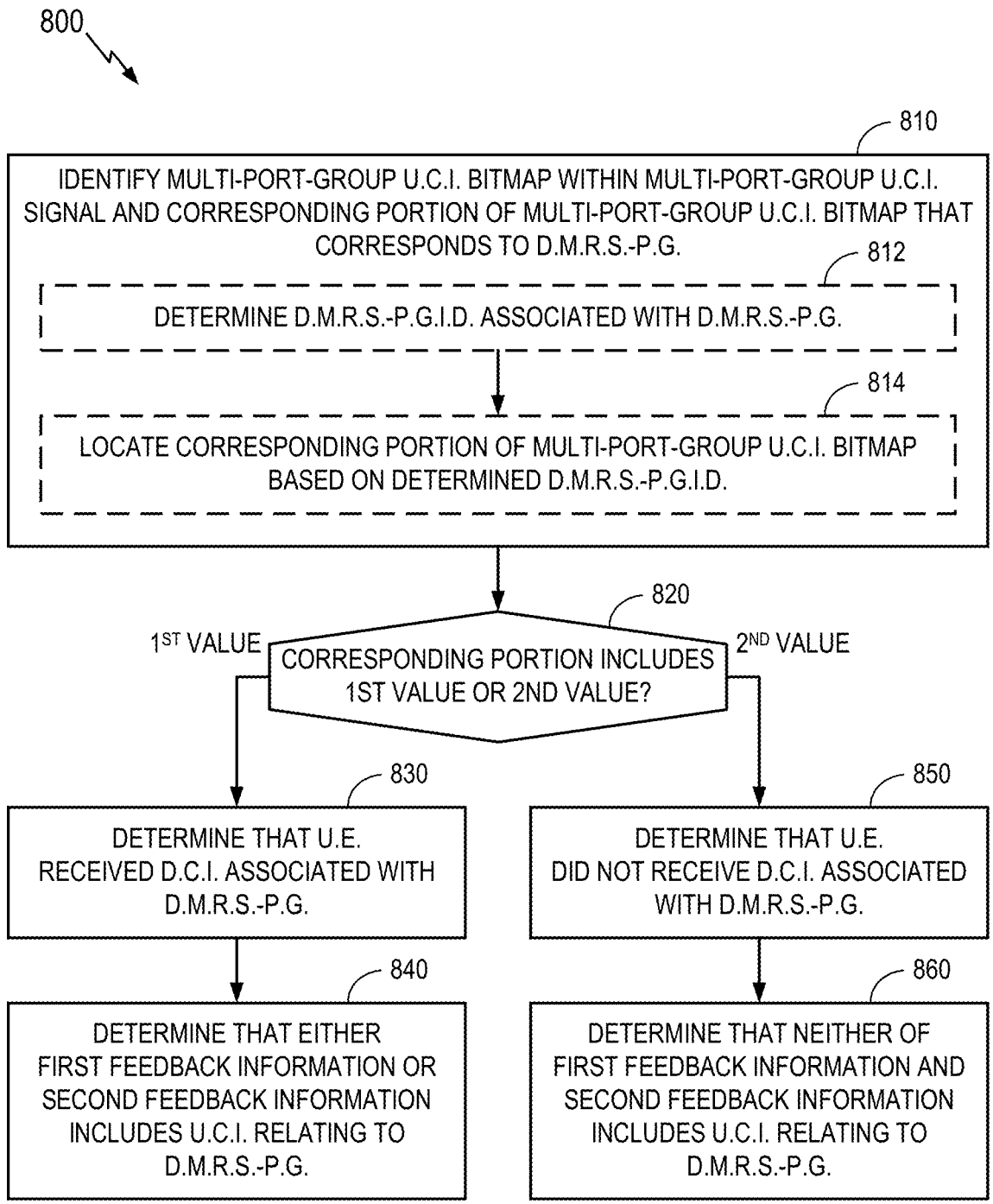
FIG. 8 generally illustrates a method for processing a multi-port-group UCI signal analogous to the multi-port-group UCI signal depicted in FIG. 6 in accordance with aspects of the disclosure.

FIG. 8 generally illustrates a method 800 for processing a multi-port-group UCI signal analogous to the multi-port-group UCI signal 600 depicted in FIG. 6 in accordance with aspects of the disclosure. The method 800 may be used to practice the processing at 440 depicted in FIG. 4. The method 800 may be performed by, for example, one or more of the network entities depicted in FIG. 5A. In the present example, the network entity may be attempting to gather feedback information corresponding to a particular DMRS-PG, i.e., the DMRS-PG 511B. However, it will be understood that the network entity may be attempting to gather and/or distribute feedback information relating to any DMRS-PG and/or any number of DMRS-PGs.

At 810, the network entity identifies the multi-port-group UCI bitmap 610 within the multi-port-group UCI signal 600 and further identifies a corresponding portion of the multi-port-group UCI bitmap 610 that corresponds to the DMRS-PG 511. The identifying at 810 may be performed by, for example, the processing system 275, the memory system 276, or any combination thereof. Accordingly, the any combination thereof may constitute means for identifying a multi-port-group UCI bitmap within a multi-port-group UCI signal and a corresponding portion of the multi-port-group UCI bitmap that corresponds to the DMRS-PG. In some implementations, the identifying at 810 may include operations described below at 812 and 814.

At 812, the network entity determines a DMRS-PGID associated with the DMRS-PG 511B. The determining at 812 may be performed by, for example, the processing system 275, the memory system 276, or any combination thereof. Accordingly, the any combination thereof may constitute means for determining a DMRS-PGID associated with the DMRS-PG.

At 814, the network entity locates the corresponding portion of the multi-port-group UCI bitmap 610 based on the determined DMRS-PGID. The locating at 814 may be performed by, for example, the processing system 275, the memory system 276, or any combination thereof. Accordingly, the any combination thereof may constitute means for locating a corresponding portion of a multi-port-group UCI bitmap based on a determined DMRS-PGID.

At 820, the network entity determines whether the corresponding portion includes a first value indicating that DCI associated with the DMRS-PG 511B was received from the TRP 511 or a second value indicating that DCI associated with the DMRS-PG 511B was not received from the TRP 511. The determining at 820 may be performed by, for example, the processing system 275, the memory system 276, or any combination thereof. Accordingly, the any combination thereof may constitute means for determining whether the corresponding portion includes a first value indicating that DCI associated with the DMRS-PG was received from the TRP or a second value indicating that DCI associated with the DMRS-PG was not received from the TRP. If the corresponding portion includes the first value ('1st value' at 820 in FIG. 8), then the method 800 proceeds to 830. If the corresponding portion includes the second value ('2nd value' at 820 in FIG. 8), then the method 800 proceeds to 850.

At 830, the network entity determines that the UE 520 received the DCI associated with the DMRS-PG 511B. The determining at 830 may be performed by, for example, the processing system 275, the memory system 276, or any combination thereof. Accordingly, the any combination thereof may constitute means for determining that a UE received DCI transmitted from the TRP.

At 840, the network entity determines that either the first feedback information or the second feedback information includes UCI relating to the DMRS-PG 511B. The determining at 840 may be performed by, for example, the processing system 275, the memory system 276, or any combination thereof. Accordingly, the any combination thereof may constitute means for determining that either first feedback information or second feedback information includes UCI relating to the DMRS-PG.

At 850, the network entity determines that the UE 520 did not receive the DCI transmission associated with the DMRS-PG 511B. The determining at 850 may be performed by, for example, the processing system 275, the memory system 276, or any combination thereof. Accordingly, the any combination thereof may constitute means for determining that a UE did not receive DCI transmission associated with the DMRS-PG.

At 860, the network entity determines that neither of the first feedback information and the second feedback information includes UCI associated with the DMRS-PG 511B. The determining at 860 may be performed by, for example, the processing system 275, the memory system 276, or any combination thereof. Accordingly, the any combination thereof may constitute means for determining that neither of the first feedback information and the second feedback information includes UCI associated with the DMRS-PG.

Figure 9:
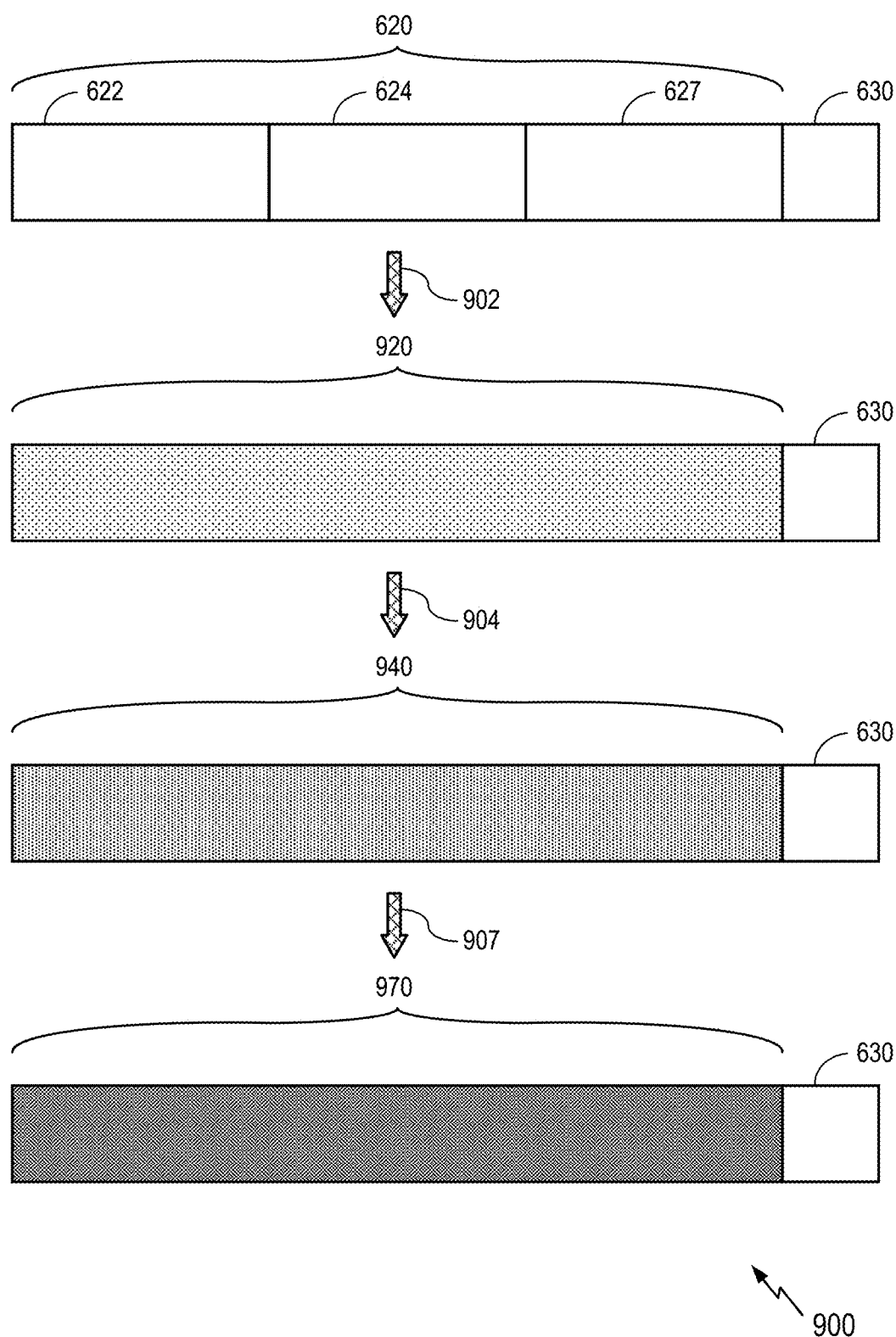
FIG. 9 generally illustrates a multi-port-group UCI signal in accordance with aspects of the disclosure.

FIG. 9 generally illustrates a multi-port-group UCI signal 900 in accordance with aspects of the disclosure. The multi-port-group UCI signal 900 depicted in FIG. 9 may correspond to the multi-port-group UCI signal 561 depicted in FIG. 5B. The multi-port-group UCI signal 900 may be generated by the UE 520 based on DCIs received from the TRPs 511, 512, 513. The multi-port-group UCI signal 900 may also be received by the network 510 (or one or more elements thereof) and processed to obtain feedback information relating to communications between one or more particular DMRS-PGs and the UE 520.

The multi-port-group UCI signal 900 may include a feedback payload analogous to the feedback payload 620 depicted in FIG. 6, and other data analogous to the other data 630 depicted in FIG. 6. As noted above, the feedback payload in a conventional UCI signal may include feedback information relating to a particular base station. By contrast, the feedback payloads depicted in FIGS. 6 and 9 may include feedback information relating to any number of DMRS-PGs. Moreover, each of the DMRS-PGs may have a corresponding DMRS-PGID. In the present example, the feedback payload 620 includes first feedback information 622 relating to DMRS-PGID '2', second feedback information 624 relating to DMRS-PGID '4', and third feedback information 627 relating to DMRS-PGID '7'.

Moreover, each of the DMRS-PGIDs may be associated with a particular scrambling sequence. In the present example, eight different DMRS-PGIDs may correspond to eight different scrambling sequences. In the present example, the DMRS-PGID '2' may correspond to a scrambling sequence 902, the DMRS-PGID '4' may correspond to a scrambling sequence 904, and the DMRS-PGID '7' may correspond to a scrambling sequence 907. Although there may be eight different scrambling sequences in the present example, only the scrambling sequences associated with DMRS-PGIDs '2', '4', and '7' may be active scrambling sequences that are used to perform the scrambling.

The UE 520 may be configured to scramble the feedback payload 620 based on the scrambling sequences of the DMRS-PGs for which feedback information is provided. In the present example, as noted above, the feedback payload 620 includes first feedback information 622 relating to DMRS-PGID '2', second feedback information 624 relating to DMRS-PGID '4', and third feedback information 627 relating to DMRS-PGID '7'. Accordingly, the feedback payload 620 is scrambled in accordance with the active scrambling sequence 902 to generate a feedback payload 920. The feedback payload 920 is then scrambled in accordance with the active scrambling sequence 904 to generate a feedback payload 940. The feedback payload 940 is then scrambled in accordance with the active scrambling sequence 907 to generate a feedback payload 970. The feedback payload 970, having been scrambled three times in accordance with the active scrambling sequences of the DMRS-PGs with which the feedback information is associated, may then be packaged in the multi-port-group UCI signal 900 and transmitted to the network 510.

As shown in FIG. 9, the other data 630 may not be scrambled, and may instead be added to the multi-port-group UCI signal 900 along with the feedback payload 970. However, it will be understood that in other implementations, the other data 630 or any component thereof may be scrambled along with the feedback payload 620.

Any network entity in the network 510 that receives the multi-port-group UCI signal 900 (for example, the TRP 511) may process the multi-port-group UCI signal 900 by attempting to descramble the sequence based on the DMRS-PGIDs associated with the TRPs known to have transmitted DCI to the UE 520.

Figure 10:
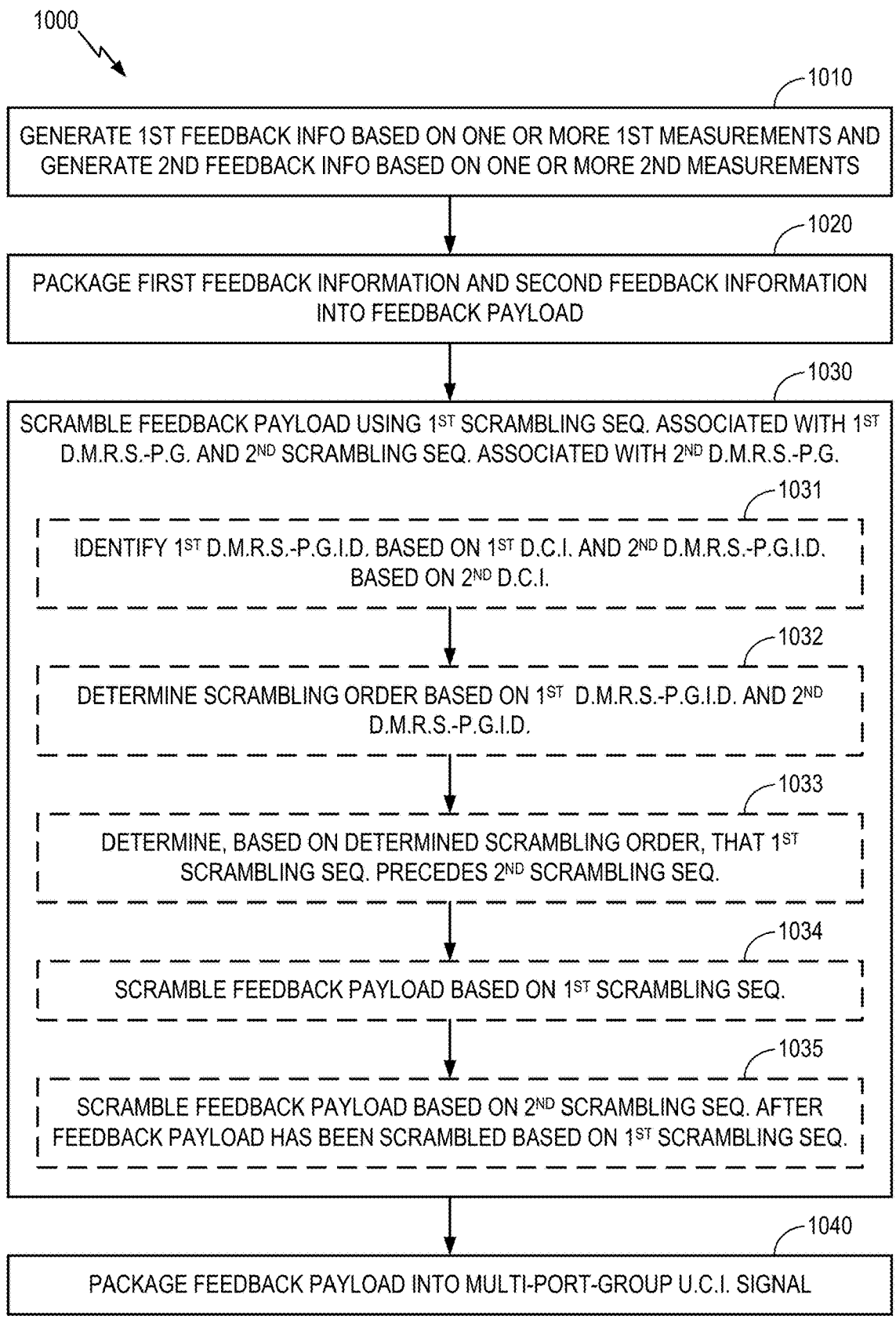
FIG. 10 generally illustrates another method for generating a multi-port-group UCI signal analogous to the multi-port-group UCI signal depicted in FIG. 9 in accordance with aspects of the disclosure.

FIG. 10 generally illustrates another method 1000 for generating a multi-port-group UCI signal analogous to the multi-port-group UCI signal 900 depicted in FIG. 9 in accordance with aspects of the disclosure. The method 1000 may be used to practice the generating at 330 depicted in FIG. 3. The method 1000 may be performed by, for example, the UE 520 depicted in FIG. 5A.

As noted above with respect to FIG. 3, the UE 520 may, at 310, receive a plurality of DCI signals. Accordingly, the UE 520 may receive a first DCI signal containing a first DMRS-PGID and a second DCI signal containing a second DMRS-PGID. Moreover, the one or more measurements performed at 320 may include one or more first measurements associated with a first DMRS-PG and one or more second measurements associated with a second DMRS-PG.

At 1010, the UE 520 generates first feedback information based on the one or more first measurements and generates second feedback information based on the one or more second measurements. The generating at 1010 may be performed by, for example, one or more of the elements depicted in FIG. 2, for example, the channel estimator 258, the processing system 259, the memory system 260, or any combination thereof. Accordingly, the any combination thereof may constitute means for generating first feedback information based on the one or more first measurements and generating second feedback information based on the one or more second measurements.

At 1020, the UE 520 packages the first feedback information and the second feedback information into a feedback payload. The packaging at 1020 may be performed by, for example, one or more of the elements depicted in FIG. 2, for example, the processing system 259, the memory system 260, or any combination thereof. Accordingly, the any combination thereof may constitute means for packaging the first feedback information and the second feedback information into a feedback payload.

At 1030, the UE 520 scrambles the feedback payload using a first scrambling sequence associated with the first DMRS-PG and a second scrambling sequence associated with the second DMRS-PG. The first scrambling sequence and the second scrambling sequence may be active scrambling sequences. The UE 520 may select the first scrambling sequence and the second scrambling sequence as active scrambling sequences upon receiving DCI containing their corresponding DMRS-PGIDs and generating feedback information associated with the corresponding DMRS-PGs. The scrambling at 1030 may be performed by, for example, one or more of the elements depicted in FIG. 2, for example, the processing system 259, the memory system 260, or any combination thereof. Accordingly, the any combination thereof may constitute means for scrambling the feedback payload using a first scrambling sequence associated with the first DMRS-PG and a second scrambling sequence associated with the second DMRS-PG.

At 1040, the UE 520 packages the feedback payload into the multi-port-group UCI signal. The packaging at 1040 may be performed by, for example, one or more of the elements depicted in FIG. 2, for example, the processing system 259, the memory system 260, or any combination thereof. Accordingly, the any combination thereof may constitute means for packaging the feedback payload into the multi-port-group UCI signal.

In some implementations, the scrambling at 1030 may be practiced as described below.

At 1031, the UE 520 identifies a first DMRS-PGID based on the first DCI and a second DMRS-PGID based on the second DCI. The identifying at 1031 may be performed by, for example, one or more of the elements depicted in FIG. 2, for example, the processing system 259, the memory system 260, or any combination thereof. Accordingly, the any combination thereof may constitute means for identifying a first DMRS-PGID based on the first DCI and a second DMRS-PGID based on the second DCI.

At 1032, the UE 520 determines a scrambling order based on the first DMRS-PGID and the second DMRS-PGID. The determining at 1032 may be performed by, for example, one or more of the elements depicted in FIG. 2, for example, the processing system 259, the memory system 260, or any combination thereof. Accordingly, the any combination thereof may constitute means for determining a scrambling order based on the first DMRS-PGID and the second DMRS-PGID.

At 1033, the UE 520 determines, based on the determined scrambling order, that the first scrambling sequence precedes the second scrambling sequence. The determining at 1033 may be performed by, for example, one or more of the elements depicted in FIG. 2, for example, the processing system 259, the memory system 260, or any combination thereof. Accordingly, the any combination thereof may constitute means for determining, based on the determined scrambling order, that the first scrambling sequence precedes the second scrambling sequence.

At 1034, the UE 520 scrambles the feedback payload based on the first scrambling sequence. The scrambling at 1034 may be performed by, for example, one or more of the elements depicted in FIG. 2, for example, the processing system 259, the memory system 260, or any combination thereof. Accordingly, the any combination thereof may constitute means for scrambling the feedback payload based on the first scrambling sequence.

At 1035, the UE 520 scrambles the feedback payload based on the second scrambling sequence after the feedback payload has been scrambled based on the first scrambling sequence. The scrambling at 1035 may be performed by, for example, one or more of the elements depicted in FIG. 2, for example, the processing system 259, the memory system 260, or any combination thereof. Accordingly, the any combination thereof may constitute means for scrambling the feedback payload based on the second scrambling sequence after the feedback payload has been scrambled based on the first scrambling sequence.

Figure 11:
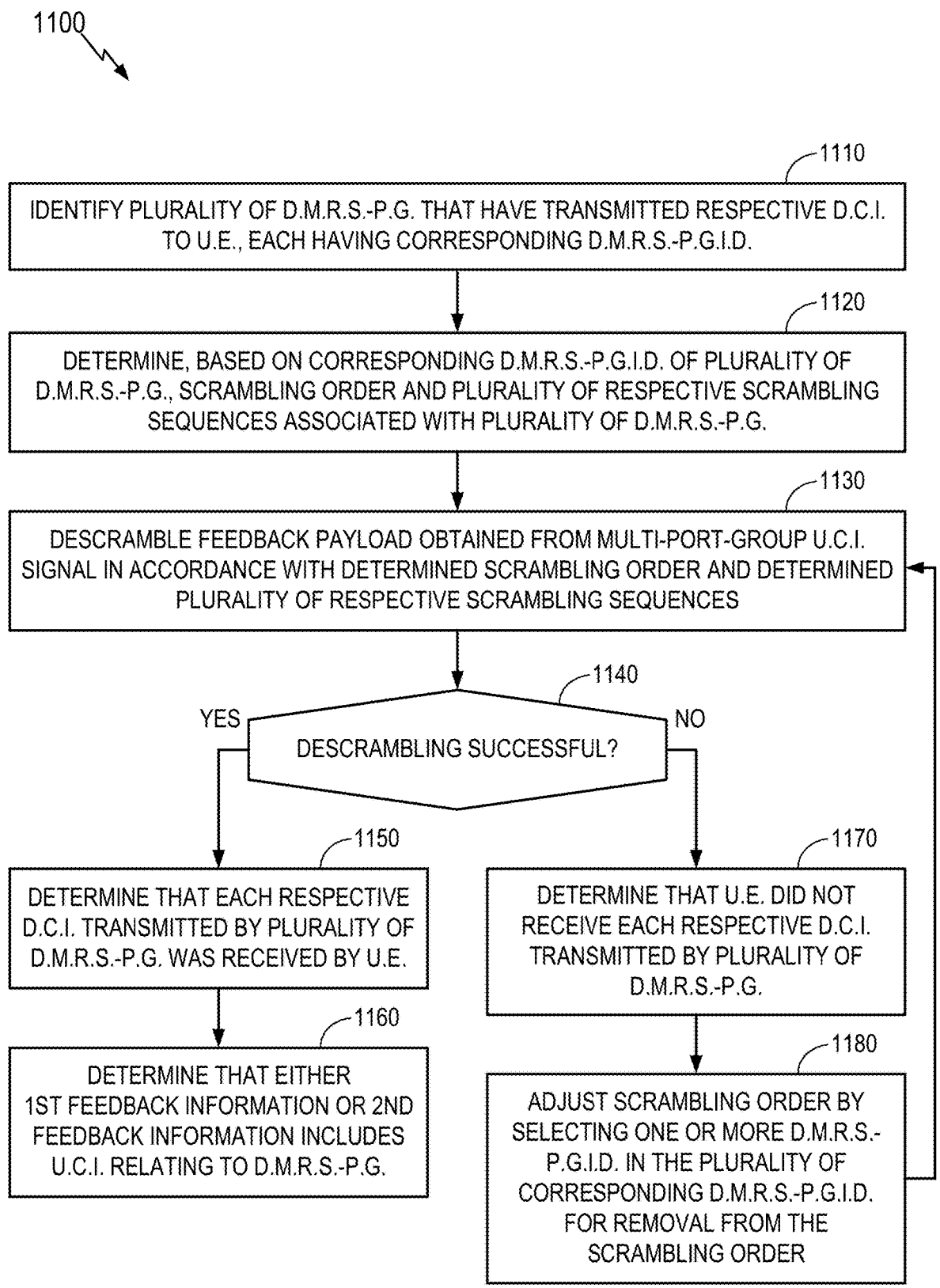
FIG. 11 generally illustrates another method for processing a multi-port-group UCI signal analogous to the multi-port-group UCI signal depicted in FIG. 9 in accordance with aspects of the disclosure.

FIG. 11 generally illustrates another method 1100 for processing a multi-port-group UCI signal analogous to the multi-port-group UCI signal 900 depicted in FIG. 9 in accordance with aspects of the disclosure. The method 1100 may be used to practice the processing at 440 depicted in FIG. 4. The method 1100 may be performed by, for example, a network entity associated with the network 510 depicted in FIG. 5A.

At 1110, the network entity identifies a plurality of TRPs that have transmitted respective DCIs to the UE, each identified TRP having a corresponding DMRS-PG/DMRS-PGID, therefore forming a plurality of DMRS-PGs and a plurality of DMRS-PGIDs. The identifying at 1110 may be performed by, for example, the processing system 275, the memory system 276, or any combination thereof. Accordingly, the any combination thereof may constitute means for identifying a plurality of TRPs that have transmitted respective DCIs to the UE, each identified TRP having a corresponding DMRS-PG/DMRS-PGID, wherein the plurality of TRPs includes the TRP and at least one other TRP.

At 1120, the network entity determines, based on the corresponding DMRS-PGIDs of the plurality of DMRS-PGs, a scrambling order and a plurality of respective scrambling sequences associated with the plurality of DMRS-PGs. The scrambling sequences determined to be associated with the plurality of DMRS-PGIDs detected from any received DCIs may be active scrambling sequences, whereas scrambling sequences associated with other DMRS-PGIDs may be inactive scrambling sequences. The determining at 1120 may be performed by, for example, the processing system 275, the memory system 276, or any combination thereof. Accordingly, the any combination thereof may constitute means for determining, based on the corresponding DMRS-PGIDs of the plurality of DMRS-PGs, a scrambling order and a plurality of respective scrambling sequences associated with the plurality of DMRS-PGs.

At 1130, the network entity descrambles a feedback payload obtained from the multi-port-group UCI signal in accordance with the determined scrambling order and the determined plurality of respective scrambling sequences. The descrambling at 1130 may be performed by, for example, the processing system 275, the memory system 276, or any combination thereof. Accordingly, the any combination thereof may constitute means for descrambling a feedback payload obtained from the multi-port-group UCI signal in accordance with the determined scrambling order and the determined plurality of respective scrambling sequences.

At 1140, the network entity determines whether the descrambling at 1130 was successful. The determining at 1140 may be performed by, for example, the processing system 275, the memory system 276, or any combination thereof. Accordingly, the any combination thereof may constitute means for determining whether descrambling was successful. If the network entity determines that the descrambling was successful ('yes' at 1140), the method 1100 proceeds to 1150. If the network entity determines that the descrambling was not successful ('no' at 1140), the method 1100 proceeds to 1170.

At 1150, the network entity determines that each of the respective DCIs associated with the plurality of DMRS-PGs was received by the UE. The determining at 1150 may be performed by, for example, the processing system 275, the memory system 276, or any combination thereof. Accordingly, the any combination thereof may constitute means for determining that each of the respective DCIs associated with the plurality of DMRS-PGs was received by the UE.

At 1160, the network entity determines that either the first feedback information or the second feedback information includes UCI relating to the DMRS-PG in response to the determination that each of the respective DCIs associated with the plurality of DMRS-PGs was received by the UE. The determining at 1160 may be performed by, for example, the processing system 275, the memory system 276, or any combination thereof. Accordingly, the any combination thereof may constitute means for determining that either the first feedback information or the second feedback information includes UCI relating to the DMRS-PG in response to the determination that each of the respective DCIs associated with the plurality of DMRS-PGs was received by the UE.

At 1170, the network entity determines that the UE did not receive each of the respective DCIs associated with the plurality of DMRS-PGs. The determining at 1170 may be performed by, for example, the processing system 275, the memory system 276, or any combination thereof. Accordingly, the any combination thereof may constitute means for determining that the UE did not receive each of the respective DCIs associated with the plurality of DMRS-PGs.

At 1180, the network entity adjusts the scrambling order by selecting one or more of the DMRS-PGIDs in the plurality of corresponding DMRS-PGIDs for removal from the scrambling order. The adjusting at 1180 may be performed by, for example, the processing system 275, the memory system 276, or any combination thereof. Accordingly, the any combination thereof may constitute means for adjusting the scrambling order by selecting one or more of the DMRS-PGIDs in the plurality of corresponding DMRS-PGIDs for removal from the scrambling order.

After the adjusting at 1180 is complete, the network entity may return to reiterate the descrambling at 1130 until a successful descrambling can be performed. By methodically removing one or more scrambling sequences from the scrambling order, the network entity may determine, through trial and error, the particular list of scrambling sequences that result in successful descrambling at 1130.

As noted above, the network entity may begin by descrambling in accordance with every DMRS-PG that transmits DCI to the UE 520. If this initial descrambling is successful, then the network entity knows that the multi-port-group UCI signal 900 includes feedback information relating to every DMRS-PG associated to each DCI transmitted to the UE 520.

If the initial descrambling is not successful, this indicates that the UE 520 has failed to receive the DCI associated to at least one of the DMRS-PGs 511B, 512B, 513B. The adjusting at 1180 may remove one scrambling sequence from the scrambling order, for example, by deactivating the scrambling sequence associated with the DMRS-PG 511B. If this adjustment results in a successful descrambling, then the network entity may determine that the UE 520 did not receive DCI associated with the DMRS-PG 511B. Otherwise, the adjusting at 1180 may reactivate the scrambling sequence associated with the DMRS-PG 511B to the scrambling order, and instead deactivate the scrambling sequence associated with the DMRS-PG 512B. If this adjustment results in a successful descrambling, then the network entity may determine that the UE 520 did not receive DCI associated with the DMRS-PG 512B. If every scrambling sequence in the scrambling order has taken a turn as the deactivated scrambling sequence, and no scrambling order has resulted in a successful descrambling, then the adjusting at 1180 may include deactivating pairs of scrambling sequences, triplets of scrambling sequences, etc., until a successful combination is found.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

The terminology used herein is for the purpose of describing particular embodiments only and not to limit any embodiments disclosed herein. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof. Similarly, the phrase "based on" as used herein does not necessarily preclude influence of other factors and should be interpreted in all cases as "based at least in part on" rather than, for example, "based solely on". Moreover, the phrase "coupled to" in electrical contexts encompasses any suitable method for delivering an electrical signal from a first node to a second node. As such, "coupled to" may encompass "coupled directly to" (for example, by direct conductive connection, such as with a copper wire, a solder ball, etc.) as well as "coupled indirectly to" (for example, having one or more intervening structures therebetween, such as a switch, a buffer, a filter, etc.). It will be further understood that terms such as "top" and "bottom", "left" and "right", "vertical" and "horizontal", etc., are relative terms used strictly in relation to one another, and do not express or imply any relation with respect to gravity, a manufacturing device used to manufacture the components described herein, or to some other device to which the components described herein are coupled, mounted, etc. It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not imply that there are only two elements and further does not imply that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements."

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for wireless communication by a user equipment (UE), comprising:
    receiving a plurality of downlink control information (DCI) signals, wherein each DCI signal is associated with a Demodulation Reference Signal (DMRS) Port Group (DMRS-PG) of a plurality of DMRS-PGs, and each DCI signal within the plurality of DCI signals contains a DMRS-PG Identifier (DMRS-PGID) identifying the associated DMRS-PG;
    performing one or more measurements associated with each DCI signal;
    generating a multi-port-group uplink control information (UCI) signal based on the one or more measurements associated with each DCI signal, wherein the multi-port-group UCI signal contains an indication of whether each DCI is successfully received.

2. The method of claim 1, further comprising:
    wherein the generating of the multi-port-group UCI signal comprises generating a multi-port-group UCI bitmap having a plurality of portions corresponding to the plurality of DMRS-PGs, wherein each portion of the UCI bitmap corresponds to a unique DMRS-PG within the plurality of DMRS-PGs;
    packing the UCI bitmap into the multi-port-group UCI signal, and transmitting the multi-port-group UCI signal to at least one network entity associated with at least one DCI of the plurality of DCI signals.

3. The method of claim 2, wherein a total number of DMRS-PGs within the plurality of DMRS-PGs is obtained by the UE based at least on any combination of an RRC configuration, and/or a separate DCI indication, and/or system information broadcasting, wherein the total number of portions within the UCI bitmap equals the total number of DMRS-PGs within the plurality of DMRS-PGs.

4. The method of claim 2, wherein generating the multi-port-group UCI bitmap comprises:
    determining that, for each portion of the UCI bitmap corresponding to a given DMRS-PG, a DMRS-PGID associated with the given DMRS-PG is successfully detected from one of the DCIs;
    setting this portion of the bitmap that has an associated DMRS-PGID being successfully detected from one of the received DCIs to a first value.

5. The method of claim 2, wherein the generating further comprises:
    determining that, for each portion of the UCI bitmap corresponding to a given DMRS-PG, an DMRS-PGID associated with the given DMRS-PG is not detected from any of the received DCIs; and setting this portion of the bitmap that has an associated DMRS-PGID not being successfully detected from any of the received DCIs to a second value.

6. The method of claim 1, wherein the generating of the multi-port-group UCI signal comprises scrambling the multi-port-group UCI signal using a plurality of scrambling sequences associated with the plurality of DMRS-PGs, wherein each scrambling sequence is associated with a unique DMRS-PG within the plurality of DMRS-PGs; and
the method further comprises transmitting the scrambled UCI signal to at least one network entity associated with at least one DCI of the plurality of DCIs.

7. The method of claim 6, wherein a total number of DMRS-PGs within the plurality of DMRS-PGs is obtained by the UE based at least on any combination of an RRC configuration, or a separate DCI indication, or system information broadcasting, wherein a total number of scrambling sequences within the plurality of scrambling sequences equals the total number of DMRS-PGs within the plurality of DMRS-PGs, wherein the plurality of scrambling sequences is based at least on predefinition within a standard, and/or RRC configuration, and/or DCI indication, and/or system information broadcast.

8. The method of claim 6, wherein the scrambling of the feedback payload comprises:
determining that, for each scrambling sequence corresponding to a given DMRS-PG, a DMRS-PGID associated with the given DMRS-PG is successfully detected from one of the DCIs, setting the scrambling sequence, which has the associated DMRS-PG being successfully detected from one of the DCIs, as an active scrambling sequence;
determining a scrambling order based on all the successfully detected DMRS-PGIDs associated with their corresponding DMRS-PGs;
determining, based on the determined scrambling order, that each one of the active scrambling sequences precedes at least one of the other active scrambling sequences;
scrambling the UCI signal based on the active scrambling sequence preceding all the other active scrambling sequences; and
for each one of the remaining active scrambling sequences, after the UCI signal has been scrambled based on all other active scrambling sequences preceding this remaining active scrambling sequence, scrambling the UCI signal based on this remaining active scrambling sequence.

9. The method of claim 8, wherein the determining of the scrambling order comprises:
sorting the detected DMRS-PGIDs in ascending order;
sorting the detected DMRS-PGIDs in an descending order; or
sorting the detected DMRS-PGIDs in a manner predetermined by a technical standard.

10. The method of claim 1, wherein:
the one or more measurements associated with each DCI comprise measurements of signaling on a channel associated with the DMRS-PG corresponding to the DCI; and
the multi-port-group UCI signal comprises at least channel state information associated with each received DCI, Hybrid Automatic Repeat Request acknowledgement information associated with each received DCI, and/or scheduling request information associated with each received DCI.

11. A method for wireless communication by a network entity, comprising:
generating a plurality of downlink control information (DCI) signals that schedule a user equipment (UE) for uplink transmission of uplink control information (UCI), wherein each DCI signal contains a Demodulation Reference Signal Port Group Identifier (DMRS-PGID) associated with a unique Demodulation Reference Signal Port Group (DMRS-PG) of a plurality of DMRS-PGs;
transmitting the DCI signals to the UE;
receiving a multi-port-group UCI signal from the UE, wherein the multi-port-group UCI signal includes feedback information scheduled by the successfully received DCIs of the transmitted plurality of DCI signals, as well as indications on whether the transmitted DCI signals are successfully received by the UE;
processing the multi-port-group UCI signal to determine association between the feedback information and the successful reception of each transmitted DCI signal.

12. The method of claim 11, wherein the processing of the multi-port-group UCI signal comprises:
identifying a multi-port-group UCI bitmap within the multi-port-group UCI signal and a corresponding portion of the multi-port-group UCI bitmap that corresponds to a DMRS-PG within the plurality of DMRS-PGs;
determining whether the corresponding portion includes a first value indicating the DCI corresponding to the DMRS-PG is received, or a second value indicating that the DCI corresponding to the DMRS-PG is not received.

13. The method of claim 12, wherein a total number of DMRS-PGs within the plurality of DMRS-PGs is configured to the UE based at least on any combination of an RRC configuration, and/or a separate DCI indication, and/or system information broadcasting, wherein a total number of portions within the UCI bitmap equals the total number of DMRS-PGs within the plurality of DMRS-PGs.

14. The method of claim 12, wherein the identifying comprises:
determining a DMRS-PG Identifier (ID) associated with the DMRS-PG; and
locating the corresponding portion of the multi-port-group UCI bitmap based on the determined DMRS-PGID.

15. The method of claim 12, wherein the processing of the multi-port-group UCI signal further comprises:
determining that the corresponding portion includes the first value indicating that DCI was received from the DMRS-PG;
determining that the UE received the DCI associated with the DMRS-PG in response to the determination that the corresponding portion includes the first value; and
determining that the UCI signal includes feedback information relating to the DMRS-PG in response to the determination that the corresponding portion includes the first value.

16. The method of claim 12, wherein the processing of the multi-port-group UCI signal further comprises:
determining that the corresponding portion includes the second value indicating that DCI was not received from the DMRS-PG;
determining that the UE did not receive the DCI associated with the DMRS-PG in response to the determination that the corresponding portion includes the second value; and determining that the UCI signal does not include feedback information relating to the DMRS-PG in response to the determination that the corresponding portion includes the second value.

17. The method of claim 11, wherein the processing of the multi-port-group UCI signal comprises:
determining a plurality of scrambling sequences associated with the plurality of DMRS-PGs, wherein each scrambling sequence is associated with a unique DMRS-PG within the plurality of DMRS-PGs;
determining from a plurality of scrambling sequences, for each DMRS-PGID of the DMRS-PGIDs contained in the transmitted DCIs, a scrambling sequence associated with this DMRS-PGID contained in a transmitted DCI; and
descrambling the multi-port-group UCI signal in accordance with the determined scrambling order and the respective scrambling sequences.

18. The method of claim 17, wherein a total number of DMRS-PGs within the plurality of DMRS-PGs is configured to the UE based at least on an RRC configuration, and/or a separate DCI indication, and/or system information broadcasting, wherein a total number of scrambling sequences within the plurality of scrambling sequences equals the total number of DMRS-PGs within the plurality of DMRS-PGs, wherein the plurality of scrambling sequences is based at least on predefinition within a standard, and/or RRC configuration, and/or DCI indication, and/or system information broadcast.

19. The method of claim 17, wherein the processing further comprises:
determining based on the descrambling that the descrambling was successful;
determining that each of the respective DCIs associated with the plurality of DMRS-PGs was received by the UE;
determining that the UCI signal includes feedback information relating to the DMRS-PGs in response to the determination that each of the respective DCIs associated with the plurality of DMRS-PGs was received by the UE.

20. The method of claim 17, wherein the processing further comprises:
determining based on the descrambling that the descrambling was not successful;
determining that the UE did not receive each of the respective DCIs associated with the plurality of DMRS-PGs;
adjusting the scrambling order by selecting one or more of the DMRS-PGIDs in the plurality of corresponding DMRS-PGIDs for removal from the scrambling order;
re-descrambling the feedback payload obtained from the multi-port-group UCI signal in accordance with the adjusted scrambling order; and
iteratively re-performing the adjusting and the re-descrambling until descrambling is successful; and
based on scrambling sequences used in the successful descrambling and the scrambling sequences associated with the DMRS-PGs corresponding to the transmitted DCIs, determine that the UCI signal includes feedback information relating to the DMRS-PGs corresponding to the scrambling sequences used in the successful descrambling, and that the UCI signal does not include feedback information relating to the DMRS-PGs corresponding to the scrambling sequences associated with the transmitted DCIs but not used in the successful descrambling.

21. The method of claim 11, wherein:
processing the multi-port-group UCI signal comprises:
determining that the UCI signal includes feedback information that corresponds to the DMRS-PGs associated with the transmitted DCI signals; and
obtaining the feedback information from the UCI signal;
the method further comprises:
identifying based on the obtained feedback information:
an adjustment of one or more transmission parameters associated with communication between the UE and the DMRS-PG based on Channel Status Information (CSI) included in the UCI;
a transmission or re-transmission of data based on Hybrid Automatic Repeat Request (HARQ) information included in the UCI; or
a modification of a schedule associated with the UE based on a scheduling request included in the UCI; and
communicating with the UE in accordance with the adjustment of the one or more transmission parameters, the transmission or re-transmission of the data, or the modification of the schedule.

22. An apparatus, comprising:
at least one transceiver configured to receive a plurality of downlink control information (DCI) signals, wherein each DCI signal is associated with a Demodulation Reference Signal (DMRS) Port Group (DMRS-PG) of a plurality of DMRS-PGs, and each DCI signal within the plurality of DCI signals contains a DMRS-PG Identifier (DMRS-PGID) identifying the associated DMRS-PG;
a memory system configured to store data, instructions, or a combination thereof, and
a processing system coupled to the memory system and the at least one transceiver, wherein the processing system and the memory system are configured to:
perform one or more measurements associated with each DCI signal; and
generate a multi-port-group uplink control information (UCI) signal based on the one or more measurements associated with each DCI signal, wherein the multi-port-group UCI signal contains an indication of whether each DCI is successfully received.

23. The apparatus of claim 22, wherein to generate the multi-port-group UCI signal, the processing system and the memory system are further configured to:
generate a multi-port-group UCI bitmap having a plurality of portions corresponding to the plurality of DMRS-PGs, wherein each portion of the UCI bitmap corresponds to a unique DMRS-PG within the plurality of DMRS-PGs; and
pack the UCI bitmap into the multi-port-group UCI signal, and transmitting the multi-port-group UCI signal to at least one network entity associated with at least one DCI of the plurality of DCI signals.

24. The apparatus of claim 23,
wherein a total number of DMRS-PGs within the plurality of DMRS-PGs is obtained by the UE based at least on any combination of an RRC configuration, and/or a separate DCI indication, and/or system information broadcasting, wherein the total number of portions within the UCI bitmap equals the total number of DMRS-PGs within the plurality of DMRS-PGs.

25. The apparatus of claim 23, wherein to generate the multi-port-group UCI signal, the processing system and the memory system are further configured to:
determine that, for each portion of the UCI bitmap corresponding to a given DMRS-PG, a DMRS-PGID associated with the given DMRS-PG is successfully detected from one of the DCIs; and
set this portion of the bitmap that has an associated DMRS-PGID being successfully detected from one of the received DCIs to a first value.

26. The apparatus of claim 23, wherein:
to generate the multi-port-group UCI signal, the processing system and the memory system are further configured to scramble the multi-port-group UCI signal using a plurality of scrambling sequences associated with the plurality of DMRS-PGs, wherein each scrambling sequence is associated with a unique DMRS-PG within the plurality of DMRS-PGs; and
the processing system and the memory system are further configured to transmit the scrambled multi-port-group UCI signal to at least one network entity associated with at least one DCI.

27. The apparatus of claim 22, wherein:
to generate the multi-port-group UCI signal, the processing system and the memory system are further configured to scramble the multi-port-group UCI signal using a plurality of scrambling sequences associated with the plurality of DMRS-PGs, wherein each scrambling sequence is associated with a unique DMRS-PG within the plurality of DMRS-PGs; and
the processing system and the memory system are further configured to transmit the scrambled multi-port-group UCI signal to at least one network entity associated with at least one DCI of the plurality of DCIs.

28. The apparatus of claim 27,
wherein a total number of DMRS-PGs within the plurality of DMRS-PGs is obtained by the UE based at least on any combination of an RRC configuration, or a separate DCI indication, or system information broadcasting, wherein a total number of scrambling sequences within the plurality of scrambling sequences equals the total number of DMRS-PGs within the plurality of DMRS-PGs, wherein the plurality of scrambling sequences is based at least on predefinition within a standard, and/or RRC configuration, and/or DCI indication, and/or system information broadcast.

29. The apparatus of claim 27, wherein to scramble the feedback payload, the processing system and the memory system are further configured to:
determine that, for each scrambling sequence corresponding to a given DMRS-PG, a DMRS-PGID associated with the given DMRS-PG is successfully detected from one of the DCIs, setting the scrambling sequence, which has the associated DMRS-PG being successfully detected from one of the DCIs, as an active scrambling sequence;
determine a scrambling order based on all the successfully detected DMRS-PGIDs associated with their corresponding DMRS-PGs;
determine, based on the determined scrambling order, that each one of the active scrambling sequences precedes at least one of the other active scrambling sequences;
scramble the UCI signal based on the active scrambling sequence preceding all the other active scrambling sequences; and
for each one of the remaining active scrambling sequences, after the UCI signal has been scrambled based on all other active scrambling sequences preceding this remaining active scrambling sequence, scrambling the UCI signal based on this remaining active scrambling sequence.

30. The apparatus of claim 22, wherein:
the one or more measurements associated with each DCI comprise measurements of signaling on a channel associated with the DMRS-PG corresponding to the DCI; and
the multi-port-group UCI signal comprises at least channel state information associated with each received DCI, Hybrid Automatic Repeat Request acknowledgement information associated with each received DCI, and/or scheduling request information associated with each received DCI.

31. An apparatus, comprising:
a memory system configured to store data, instructions, or a combination thereof; and
a processing system coupled to the memory system, wherein the processing system and the memory system are configured to generate a plurality of downlink control information (DCI) signals that schedule a user equipment (UE) for uplink transmission of uplink control information (UCI), wherein each DCI signal contains a Demodulation Reference Signal Port Group Identifier (DMRS-PGID) associated with a unique Demodulation Reference Signal Port Group (DMRS-PG) of a plurality of DMRS-PGs; and
at least one transceiver configured to:
transmit the DCI signals to the UE; and
receive a multi-port-group UCI signal from the UE, wherein the multi-port-group UCI signal includes feedback information scheduled by the successfully received DCIs of the transmitted plurality of DCI signals, as well as indications on whether the transmitted DCI signals are successfully received by the UE;
wherein the processing system and the memory system are further configured to process the multi-port-group UCI signal to determine association between the feedback information and the successful reception of each transmitted DCI signal.

32. The apparatus of claim 31, wherein to process the multi-port-group UCI signal, the processing system and the memory system are further configured to:
identify a multi-port-group UCI bitmap within the multi-port-group UCI signal and a corresponding portion of the multi-port-group UCI bitmap that corresponds to a DMRS-PG within the plurality of DMRS-PGs; and
determine whether the corresponding portion includes a first value indicating the DCI corresponding to the DMRS-PG is received, or a second value indicating that the DCI corresponding to the DMRS-PG is not received.

33. The apparatus of claim 32, wherein a total number of DMRS-PGs within the plurality of DMRS-PGs is configured to the UE based at least on any combination of an RRC configuration, and/or a separate DCI indication, and/or system information broadcasting, wherein a total number of portions within the UCI bitmap equals the total number of DMRS-PGs within the plurality of DMRS-PGs.

34. The apparatus of claim 32, wherein to identify the multi-port-group UCI bitmap, the processing system and the memory system are further configured to:
determine a DMRS-PG Identifier (ID) associated with the DMRS-PG; and locate the corresponding portion of the multi-port-group UCI bitmap based on the determined DMRS-PGID.

35. The apparatus of claim 32, wherein to process the multi-port-group UCI signal, the processing system and the memory system are further configured to:
determine that the corresponding portion includes the first value indicating that DCI was received from the DMRS-PG;
determine that the UE received the DCI associated with the DMRS-PG in response to the determination that the corresponding portion includes the first value; and
determine that the UCI signal includes feedback information relating to the DMRS-PG in response to the determination that the corresponding portion includes the first value.

36. The apparatus of claim 32, wherein to process the multi-port-group UCI signal, the processing system and the memory system are further configured to:
determine that the corresponding portion includes the second value indicating that DCI was not received from the DMRS-PG;
determine that the UE did not receive the DCI associated with the DMRS-PG in response to the determination that the corresponding portion includes the second value; and
determine that the UCI signal does not include feedback information relating to the DMRS-PG in response to the determination that the corresponding portion includes the second value.

37. The apparatus of claim 31, wherein to process the multi-port-group UCI signal, the processing system and the memory system are further configured to:
determine a plurality of scrambling sequences associated with the plurality of DMRS-PGs, wherein each scrambling sequence is associated with a unique DMRS-PG within the plurality of DMRS-PGs;
determine from a plurality of scrambling sequences, for each DMRS-PGID of the DMRS-PGIDs contained in the transmitted DCIs, a scrambling sequence associated with this DMRS-PGID contained in a transmitted DCI; and
descramble the multi-port-group UCI signal in accordance with the determined scrambling order and the respective scrambling sequences.

38. The apparatus of claim 37,
wherein a total number of DMRS-PGs within the plurality of DMRS-PGs is configured to the UE based at least on an RRC configuration, and/or a separate DCI indication, and/or system information broadcasting, wherein a total number of scrambling sequences within the plurality of scrambling sequences equals the total number of DMRS-PGs within the plurality of DMRS-PGs, wherein the plurality of scrambling sequences is based at least on predefinition within a standard, and/or RRC configuration, and/or DCI indication, and/or system information broadcast.

39. The apparatus of claim 37, wherein to process the multi-port-group UCI signal, the processing system and the memory system are further configured to:
determine based on the descrambling that the descrambling was successful;
determine that each of the respective DCIs associated with the plurality of DMRS-PGs was received by the UE;
determine that the UCI signal includes feedback information relating to the DMRS-PGs in response to the determination that each of the respective DCIs associated with the plurality of DMRS-PGs was received by the UE.

40. The apparatus of claim 37, wherein to process the multi-port-group UCI signal, the processing system and the memory system are further configured to:
determine based on the descrambling that the descrambling was not successful;
determine that the UE did not receive each of the respective DCIs associated with the plurality of DMRS-PGs;
adjust the scrambling order by selecting one or more of the DMRS-PGIDs in the plurality of corresponding DMRS-PGIDs for removal from the scrambling order;
re-descramble the feedback payload obtained from the multi-port-group UCI signal in accordance with the adjusted scrambling order; and
iteratively re-perform the adjusting and the re-descrambling until descrambling is successful; and
based on scrambling sequences used in the successful descrambling and the scrambling sequences associated with the DMRS-PGs corresponding to the transmitted DCIs, determine that the UCI signal includes feedback information relating to the DMRS-PGs corresponding to the scrambling sequences used in the successful descrambling, and that the UCI signal does not include feedback information relating to the DMRS-PGs corresponding to the scrambling sequences associated with the transmitted DCIs but not used in the successful descrambling.

41. An apparatus, comprising:
means for receiving a plurality of downlink control information (DCI) signals, wherein each DCI signal is associated with a Demodulation Reference Signal (DMRS) Port Group (DMRS-PG) of a plurality of DMRS-PGs, and each DCI signal within the plurality of DCI signals contains a DMRS-PG Identifier (DMRS-PGID) identifying the associated DMRS-PG;
means for performing one or more measurements associated with each DCI signal; and
means for generating a multi-port-group uplink control information (UCI) signal based on the one or more measurements associated with each DCI signal, wherein the multi-port-group UCI signal contains an indication of whether each DCI is successfully received.

42. The apparatus of claim 41, wherein the means for generating the multi-port-group UCI signal comprises:
means for generating a multi-port-group UCI bitmap having a plurality of portions corresponding to the plurality of DMRS-PGs, wherein each portion of the UCI bitmap corresponds to a unique DMRS-PG within the plurality of DMRS-PGs; and
means for packing the UCI bitmap into the multi-port-group UCI signal, and transmitting the multi-port-group UCI signal to at least one network entity associated with at least one DCI of the plurality of DCI signals.

43. The apparatus of claim 42,
wherein a total number of DMRS-PGs within the plurality of DMRS-PGs is obtained by the UE based at least on any combination of an RRC configuration, and/or a separate DCI indication, and/or system information broadcasting, wherein the total number of portions within the UCI bitmap equals the total number of DMRS-PGs within the plurality of DMRS-PGs.

44. The apparatus of claim 41, wherein the means for generating the multi-port-group UCI signal comprises:

means for scrambling the multi-port-group UCI signal using a plurality of scrambling sequences associated with the plurality of DMRS-PGs, wherein each scrambling sequence is associated with a unique DMRS-PG within the plurality of DMRS-PGs;

means for transmitting the scrambled UCI signal to at least one network entity associated with at least one DCI of the plurality of DCIs.

45. The apparatus of claim 44,
wherein a total number of DMRS-PGs within the plurality of DMRS-PGs is obtained by the UE based at least on any combination of an RRC configuration, or a separate DCI indication, or system information broadcasting, wherein a total number of scrambling sequences within the plurality of scrambling sequences equals the total number of DMRS-PGs within the plurality of DMRS-PGs, wherein the plurality of scrambling sequences is based at least on predefinition within a standard, and/or RRC configuration, and/or DCI indication, and/or system information broadcast.

46. An apparatus, comprising:
means for generating a plurality of downlink control information (DCI) signals that schedule a user equipment (UE) for uplink transmission of uplink control information (UCI), wherein each DCI signal contains a Demodulation Reference Signal Port Group Identifier (DMRS-PGID) associated with a unique Demodulation Reference Signal Port Group (DMRS-PG) of a plurality of DMRS-PGs;

means for transmitting the DCI signals to the UE;

means for receiving a multi-port-group UCI signal from the UE, wherein the multi-port-group UCI signal includes feedback information scheduled by the successfully received DCIs of the transmitted plurality of DCI signals, as well as indications on whether the transmitted DCI signals are successfully received by the UE;

means for processing the multi-port-group UCI signal to determine association between the feedback information and the successful reception of each transmitted DCI signal.

47. The apparatus of claim 46, wherein the means for processing the multi-port-group UCI signal comprises:
means for identifying a multi-port-group UCI bitmap within the multi-port-group UCI signal and a corresponding portion of the multi-port-group UCI bitmap that corresponds to a DMRS-PG within the plurality of DMRS-PGs; and
means for determining whether the corresponding portion includes a first value indicating the DCI corresponding to the DMRS-PG is received, or a second value indicating that the DCI corresponding to the DMRS-PG is not received.

48. The apparatus of claim 47, wherein a total number of DMRS-PGs within the plurality of DMRS-PGs is configured to the UE based at least on any combination of an RRC configuration, and/or a separate DCI indication, and/or system information broadcasting, wherein a total number of portions within the UCI bitmap equals the total number of DMRS-PGs within the plurality of DMRS-PGs.

49. The apparatus of claim 46, wherein the means for identifying comprises:
means for determining a DMRS-PG Identifier (ID) associated with the DMRS-PG; and
means for locating the corresponding portion of the multi-port-group UCI bitmap based on the determined DMRS-PGID.

50. The apparatus of claim 49, wherein the means for processing the multi-port-group UCI signal comprises:
means for determining that the corresponding portion includes the first value indicating that DCI was received from the DMRS-PG;
means for determining that the UE received the DCI associated with the DMRS-PG in response to the determination that the corresponding portion includes the first value;
means for determining that the UCI signal includes feedback information relating to the DMRS-PG in response to the determination that the corresponding portion includes the first value.

51. A non-transitory computer-readable medium comprising at least one instruction for causing a processor to perform operations, comprising:
code for receiving a plurality of downlink control information (DCI) signals, wherein each DCI signal is associated with a Demodulation Reference Signal (DMRS) Port Group (DMRS-PG) of a plurality of DMRS-PGs, and each DCI signal within the plurality of DCI signals contains a DMRS-PG Identifier (DMRS-PGID) identifying the associated DMRS-PG;
code for performing one or more measurements associated with each DCI signal; and
code for generating a multi-port-group uplink control information (UCI) signal based on the one or more measurements associated with each DCI signal, wherein the multi-port-group UCI signal contains an indication of whether each DCI is successfully received.

52. The non-transitory computer-readable medium of claim 51, wherein the code for generating the multi-port-group UCI signal comprises:
code for generating a multi-port-group UCI bitmap having a plurality of portions corresponding to the plurality of DMRS-PGs, wherein each portion of the UCI bitmap corresponds to a unique DMRS-PG within the plurality of DMRS-PGs; and
code for packing the UCI bitmap into the multi-port-group UCI signal, and transmitting the multi-port-group UCI signal to at least one network entity associated with at least one DCI of the plurality of DCI signals.

53. The non-transitory computer-readable medium of claim 52,
wherein a total number of DMRS-PGs within the plurality of DMRS-PGs is obtained by the UE based at least on any combination of an RRC configuration, and/or a separate DCI indication, and/or system information broadcasting, wherein the total number of portions within the UCI bitmap equals the total number of DMRS-PGs within the plurality of DMRS-PGs.

54. The non-transitory computer-readable medium of claim 51, wherein the code for generating the multi-port-group UCI signal comprises:
code for scrambling the multi-port-group UCI signal using a plurality of scrambling sequences associated with the plurality of DMRS-PGs, wherein each scrambling sequence is associated with a unique DMRS-PG within the plurality of DMRS-PGs;
code for transmitting the scrambled UCI signal to at least one network entity associated with at least one DCI of the plurality of DCIs.

55. The non-transitory computer-readable medium of claim 54, wherein a total number of DMRS-PGs within the plurality of DMRS-PGs is obtained by the UE based at least on any combination of an RRC configuration, or a separate DCI indication, or system information broadcasting, wherein a total number of scrambling sequences within the plurality of scrambling sequences equals the total number of DMRS-PGs within the plurality of DMRS-PGs, wherein the plurality of scrambling sequences is based at least on predefinition within a standard, and/or RRC configuration, and/or DCI indication, and/or system information broadcast.

56. A non-transitory computer-readable medium comprising at least one instruction for causing a processor to perform operations, comprising:
- code for generating a plurality of downlink control information (DCI) signals that schedule a user equipment (UE) for uplink transmission of uplink control information (UCI), wherein each DCI signal contains a Demodulation Reference Signal Port Group Identifier (DMRS-PGID) associated with a unique Demodulation Reference Signal Port Group (DMRS-PG) of a plurality of DMRS-PGs;
- code for transmitting the DCI signals to the UE;
- code for receiving a multi-port-group UCI signal from the UE, wherein the multi-port-group UCI signal includes feedback information scheduled by the successfully received DCIs of the transmitted plurality of DCI signals, as well as indications on whether the transmitted DCI signals are successfully received by the UE;
- code for processing the multi-port-group UCI signal to determine association between the feedback information and the successful reception of each transmitted DCI signal.

57. The non-transitory computer-readable medium of claim 56, wherein the code for processing the multi-port-group UCI signal comprises:
- code for identifying a multi-port-group UCI bitmap within the multi-port-group UCI signal and a corresponding portion of the multi-port-group UCI bitmap that corresponds to a DMRS-PG within the plurality of DMRS-PGs; and
- code for determining whether the corresponding portion includes a first value indicating the DCI corresponding to the DMRS-PG is received, or a second value indicating that the DCI corresponding to the DMRS-PG is not received.

58. The non-transitory computer-readable medium of claim 57, wherein a total number of DMRS-PGs within the plurality of DMRS-PGs is configured to the UE based at least on any combination of an RRC configuration, and/or a separate DCI indication, and/or system information broadcasting, wherein a total number of portions within the UCI bitmap equals the total number of DMRS-PGs within the plurality of DMRS-PGs.

59. The non-transitory computer-readable medium of claim 56, wherein the code for identifying comprises:
- code for determining a DMRS-PG Identifier (ID) associated with the DMRS-PG; and
- code for locating the corresponding portion of the multi-port-group UCI bitmap based on the determined DMRS-PGID.

60. The non-transitory computer-readable medium of claim 59, wherein the code for processing the multi-port-group UCI signal comprises:
- code for determining that the corresponding portion includes the first value indicating that DCI was received from the DMRS-PG;
- code for determining that the UE received the DCI associated with the DMRS-PG in response to the determination that the corresponding portion includes the first value;
- code for determining that the UCI signal includes feedback information relating to the DMRS-PG in response to the determination that the corresponding portion includes the first value.

* * * * *